US012675419B1

(12) United States Patent
Gal et al.

(10) Patent No.: US 12,675,419 B1
(45) Date of Patent: Jul. 7, 2026

(54) ENCODING AND TRANSMITTING SENSOR DATA IN LOW POWER BROADCASTS

(71) Applicant: Samsara Inc., San Francisco, CA (US)

(72) Inventors: David Gal, Oakland, CA (US); Jeffrey Mehlman, Pleasanton, CA (US); Benedict Fraser Walker, San Francisco, CA (US); Wael Barakat, San Francisco, CA (US); Ernie Aguilar, Austin, TX (US); Benjamin Arthur Calderon, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/173,719

(22) Filed: Apr. 8, 2025

Related U.S. Application Data

(60) Provisional application No. 63/664,105, filed on Jun. 25, 2024, provisional application No. 63/631,353, filed on Apr. 8, 2024.

(51) Int. Cl.
 *G06F 13/10* (2006.01)
 *H04W 4/029* (2018.01)
(52) U.S. Cl.
 CPC ............ *G06F 13/10* (2013.01); *H04W 4/029* (2018.02); *G06F 2213/40* (2013.01)
(58) Field of Classification Search
 CPC ..... G06F 13/10; G06F 2213/40; H04W 4/029
 See application file for complete search history.

(56) References Cited

U.S. PATENT DOCUMENTS

| | | | |
|---|---|---|---|
| 4,671,111 A | 6/1987 | Lemelson | |
| 5,825,283 A | 10/1998 | Camhi | |
| 5,910,987 A | 6/1999 | Ginter et al. | |
| 5,917,433 A | 6/1999 | Keillor et al. | |
| 6,064,299 A | 5/2000 | Lesesky et al. | |
| 6,098,048 A | 8/2000 | Dashefsky et al. | |
| 6,157,864 A | 12/2000 | Schwenke et al. | |
| 6,253,129 B1 | 6/2001 | Jenkins et al. | |
| 6,317,668 B1 | 11/2001 | Thibault et al. | |
| 6,411,203 B1 | 6/2002 | Lesesky et al. | |
| 6,421,590 B2 | 7/2002 | Thibault | |
| 6,452,487 B1 | 9/2002 | Krupinski | |

(Continued)

FOREIGN PATENT DOCUMENTS

| | | |
|---|---|---|
| CN | 111047179 A | 4/2020 |
| DE | 10 2004 015 221 A1 | 10/2005 |

(Continued)

OTHER PUBLICATIONS

U.S. Appl. No. 18/830,325, Connection Throttling in a Low Power Physical Assest Tracking System, filed Sep. 10, 2024.

(Continued)

*Primary Examiner* — Zachary K Huson
(74) *Attorney, Agent, or Firm* — Knobbe, Martens, Olson & Bear, LLP

(57) ABSTRACT

A low power communication system provides efficient sensor data transmission using Bluetooth Low Energy (BLE) broadcasts to minimize power consumption while maximizing data flexibility and reliability. The system enables peripherals to transmit sensor data in a connectionless manner, utilizing Service Universally Unique Identifiers (UUIDs) and Tag-Length-Value (TLV) structures, for example.

20 Claims, 7 Drawing Sheets

(56)　　　　　References Cited

U.S. PATENT DOCUMENTS

| | | |
|---|---|---|
| 6,505,106 B1 | 1/2003 | Lawrence et al. |
| 6,651,063 B1 | 11/2003 | Vorobiev |
| 6,714,894 B1 | 3/2004 | Tobey et al. |
| 6,718,239 B2 | 4/2004 | Rayner |
| 6,741,165 B1 | 5/2004 | Langfahl et al. |
| 6,801,920 B1 | 10/2004 | Wischinski |
| 6,977,612 B1 | 12/2005 | Bennett |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,243,371 B1 | 7/2007 | Kasper et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | McClellan et al. |
| 7,877,198 B2 | 1/2011 | Tenzer et al. |
| 7,881,838 B2 | 2/2011 | Larschan et al. |
| 7,891,012 B1 | 2/2011 | Kiel et al. |
| 7,904,714 B2 | 3/2011 | Lee et al. |
| 7,933,840 B2 | 4/2011 | Zank |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,037,313 B2 | 10/2011 | Hamalainen et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,621,576 B2 | 12/2013 | Jureczki et al. |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B1 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,172,713 B2 | 10/2015 | Joffe et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,535,857 B2 | 1/2017 | Dabbiere |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,034,130 B2 | 7/2018 | DeLuca et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,121,118 B1 | 11/2018 | Kim et al. |
| 10,127,810 B2 | 11/2018 | Durie, Jr. et al. |
| 10,157,321 B2 | 12/2018 | Becker et al. |
| 10,163,107 B1 | 12/2018 | White et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,275,959 B2 | 4/2019 | Ricci |
| 10,277,455 B2 | 4/2019 | Erdmann |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,382,897 B1 | 8/2019 | Lanes et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,567,387 B1 | 2/2020 | Trinh et al. |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |
| 10,645,066 B2 | 5/2020 | Swahn |
| 10,652,335 B2 | 5/2020 | Botticelli |
| 10,715,976 B2 | 7/2020 | Hoffner et al. |
| 10,749,700 B2 | 8/2020 | Raleigh et al. |
| 10,762,363 B2 | 9/2020 | Watanabe |
| 10,782,691 B2 | 9/2020 | Suresh et al. |

(56) References Cited

U.S. PATENT DOCUMENTS

| | | | |
|---|---|---|---|
| 10,788,990 B2 | 9/2020 | Kim et al. |
| 10,789,840 B2 | 9/2020 | Boykin et al. |
| 10,798,522 B1 | 10/2020 | Benjamin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,007,846 B2 | 5/2021 | Badger, II et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,636 B1 | 9/2021 | Jorasch et al. |
| 11,131,986 B1 | 9/2021 | Gal et al. |
| 11,132,853 B1 | 9/2021 | Akhtar et al. |
| 11,133,113 B2 | 9/2021 | DeBates et al. |
| 11,137,744 B1 | 10/2021 | Heddleston et al. |
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,245,517 B1 | 2/2022 | Tsarfati et al. |
| 11,260,878 B2 | 3/2022 | Palmer et al. |
| 11,297,568 B2 | 4/2022 | Baird et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,364,386 B2 | 6/2022 | Ibarrola et al. |
| 11,365,980 B1 | 6/2022 | Akhtar et al. |
| 11,374,761 B2 | 6/2022 | Kapinos et al. |
| 11,386,325 B1 | 7/2022 | Srinivasan et al. |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,532,169 B1 | 12/2022 | Hassan et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,798,187 B2 | 10/2023 | Zaheer et al. |
| 11,798,298 B2 | 10/2023 | Hassan et al. |
| 11,800,317 B1 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 12,106,613 B2 | 10/2024 | Calmer et al. |
| 12,117,546 B1 | 10/2024 | Lloyd et al. |
| 12,126,917 B1 | 10/2024 | Shemet et al. |
| 12,128,919 B2 | 10/2024 | Calmer et al. |
| 12,140,445 B1 | 11/2024 | Akhtar et al. |
| 12,150,186 B1 | 11/2024 | Aguilar et al. |
| 12,165,360 B1 | 12/2024 | Jain et al. |
| 12,168,445 B1 | 12/2024 | Srinivasan et al. |
| 12,172,653 B1 | 12/2024 | Akhtar et al. |
| 12,179,629 B1 | 12/2024 | Govan et al. |
| 12,197,610 B2 | 1/2025 | Wen et al. |
| 12,213,090 B1 | 1/2025 | Dergosits et al. |
| 12,228,944 B1 | 2/2025 | Dubin et al. |
| 12,253,617 B1 | 3/2025 | Aguilar et al. |
| 12,256,021 B1 | 3/2025 | Torres et al. |
| 12,260,616 B1 | 3/2025 | Rajan et al. |
| 12,269,498 B1 | 4/2025 | Rommel et al. |
| 12,289,181 B1 | 4/2025 | Stevenson et al. |
| 12,306,010 B1 | 5/2025 | Rommel et al. |
| 12,327,445 B1 | 6/2025 | Eberhardt et al. |
| 12,328,639 B1 | 6/2025 | Smith et al. |
| 12,344,168 B1 | 7/2025 | Wang et al. |
| 12,346,712 B1 | 7/2025 | Eberhardt et al. |
| 12,367,718 B1 | 7/2025 | Calmer et al. |
| 12,368,903 B1 | 7/2025 | Lin et al. |
| 12,426,007 B1 | 9/2025 | Aguilar et al. |
| 12,445,285 B1 | 10/2025 | McHugh et al. |
| 12,450,329 B1 | 10/2025 | Torres et al. |
| 12,479,446 B1 | 11/2025 | Jurden et al. |
| 12,501,178 B1 | 12/2025 | Shemet et al. |
| 12,511,947 B1 | 12/2025 | Symons et al. |
| 12,524,314 B1 | 1/2026 | Rajadurai et al. |
| 12,534,097 B1 | 1/2026 | Rajvanshi et al. |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0107361 A1 | 6/2004 | Redan et al. |
| 2004/0236476 A1 | 11/2004 | Chowdhary |

(56)                    References Cited

U.S. PATENT DOCUMENTS

| | | |
|---|---|---|
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0053295 A1 | 3/2006 | Madhusudan et al. |
| 2006/0167591 A1 | 7/2006 | McNally |
| 2007/0050108 A1 | 3/2007 | Larschan et al. |
| 2007/0173991 A1 | 7/2007 | Tenzer et al. |
| 2008/0252487 A1 | 10/2008 | McClellan et al. |
| 2008/0261622 A1 | 10/2008 | Lee et al. |
| 2008/0319602 A1 | 12/2008 | McClellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0265061 A1 | 10/2010 | Harmon et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0072219 A1 | 3/2013 | Zhang et al. |
| 2013/0073112 A1 | 3/2013 | Phelan et al. |
| 2013/0147617 A1 | 6/2013 | Boling et al. |
| 2013/0162421 A1 | 6/2013 | Naguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0310162 A1 | 10/2014 | Collins |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0097674 A1 | 4/2015 | Mondal et al. |
| 2015/0116114 A1 | 4/2015 | Boyles |
| 2015/0148077 A1 | 5/2015 | Jelle |
| 2015/0149086 A1 | 5/2015 | Albert, Jr. et al. |
| 2015/0226563 A1 | 8/2015 | Cox et al. |
| 2015/0281889 A1 | 10/2015 | Menendez |
| 2015/0283912 A1 | 10/2015 | Shimizu et al. |
| 2015/0347121 A1 | 12/2015 | Harumoto |
| 2015/0356289 A1 | 12/2015 | Brown et al. |
| 2016/0046298 A1 | 2/2016 | DeRuyck et al. |
| 2016/0100282 A1 | 4/2016 | Pounds et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0343100 A1 | 11/2016 | Davenport et al. |
| 2016/0375780 A1 | 12/2016 | Penilla et al. |
| 2016/0381510 A1 | 12/2016 | Reynolds |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0111770 A1 | 4/2017 | Kusens |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0007149 A1 | 1/2018 | Gauglitz |
| 2018/0012196 A1 | 1/2018 | Ricci et al. |
| 2018/0025636 A1 | 1/2018 | Boykin et al. |
| 2018/0054710 A1* | 2/2018 | Gum .................... G09B 29/102 |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0184241 A1 | 6/2018 | Alizadeh-Shabdiz et al. |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0321356 A1 | 11/2018 | Kulkarni et al. |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0025062 A1 | 1/2019 | Young et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0090084 A1 | 3/2019 | Jacobs et al. |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0362304 A1 | 11/2019 | Vivas Suarez et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0034928 A1 | 1/2020 | Lim et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0077246 A1 | 3/2020 | Mars et al. |
| 2020/0092682 A1 | 3/2020 | Winograd et al. |
| 2020/0096598 A1 | 3/2020 | Jadav et al. |
| 2020/0139847 A1 | 5/2020 | Baumer et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |

(56) References Cited

U.S. PATENT DOCUMENTS

| 2020/0236619 | A1 | 7/2020 | Baird et al. | |
| 2020/0250611 | A1* | 8/2020 | Pourteymour | G06F 9/542 |
| 2020/0283003 | A1 | 9/2020 | Raichelgauz | |
| 2020/0311602 | A1 | 10/2020 | Hawley et al. | |
| 2020/0312155 | A1 | 10/2020 | Kelkar et al. | |
| 2020/0327009 | A1 | 10/2020 | Callison et al. | |
| 2020/0327369 | A1 | 10/2020 | Cruz et al. | |
| 2020/0329334 | A1 | 10/2020 | Kurian | |
| 2020/0342230 | A1 | 10/2020 | Tsai et al. | |
| 2020/0342506 | A1 | 10/2020 | Levy et al. | |
| 2020/0366468 | A1 | 11/2020 | Khandani | |
| 2020/0371773 | A1 | 11/2020 | Kato et al. | |
| 2020/0380806 | A1 | 12/2020 | Tabata | |
| 2020/0389415 | A1 | 12/2020 | Zhao et al. | |
| 2020/0409929 | A1 | 12/2020 | Kodavarti et al. | |
| 2021/0097315 | A1 | 4/2021 | Carruthers et al. | |
| 2021/0105574 | A1 | 4/2021 | Kim et al. | |
| 2021/0133160 | A1 | 5/2021 | Craft | |
| 2021/0235410 | A1 | 7/2021 | Hollar et al. | |
| 2021/0397908 | A1 | 12/2021 | ElHattab et al. | |
| 2022/0059218 | A1 | 2/2022 | Fischer | |
| 2022/0095698 | A1 | 3/2022 | Talbot et al. | |
| 2022/0165073 | A1 | 5/2022 | Shikii et al. | |
| 2022/0283051 | A1 | 9/2022 | Weiler | |
| 2022/0289203 | A1 | 9/2022 | Makilya et al. | |
| 2022/0374737 | A1 | 11/2022 | Dhara et al. | |
| 2022/0377517 | A1 | 11/2022 | Altshul et al. | |
| 2023/0077207 | A1 | 3/2023 | Hassan et al. | |
| 2023/0104403 | A1 | 4/2023 | Erez et al. | |
| 2023/0153735 | A1 | 5/2023 | Dhara et al. | |
| 2023/0169420 | A1 | 6/2023 | Dhara et al. | |
| 2023/0188940 | A1 | 6/2023 | Andre et al. | |
| 2023/0221985 | A1 | 7/2023 | Tsirkin | |
| 2023/0281553 | A1 | 9/2023 | Singh et al. | |
| 2023/0291243 | A1 | 9/2023 | Audet et al. | |
| 2023/0379388 | A1* | 11/2023 | Zhang | H04L 69/24 |
| 2024/0003749 | A1 | 1/2024 | Lin et al. | |
| 2024/0005678 | A1 | 1/2024 | Hassan et al. | |
| 2024/0013423 | A1 | 1/2024 | Zaheer et al. | |
| 2024/0025546 | A1* | 1/2024 | Volkerink | G01S 1/045 |
| 2024/0030753 | A1 | 1/2024 | Kim et al. | |
| 2024/0063596 | A1 | 2/2024 | Pandian et al. | |
| 2024/0146629 | A1 | 5/2024 | Lloyd | |
| 2024/0259815 | A1 | 8/2024 | Boyapalle et al. | |
| 2025/0002033 | A1 | 1/2025 | Calmer et al. | |
| 2025/0054378 | A1 | 2/2025 | Nagy | |

FOREIGN PATENT DOCUMENTS

| EP | 1615178 | A2 | 1/2006 |
| GB | 2288892 | A | 11/1995 |
| WO | WO 2017/123665 | A1 | 7/2017 |
| WO | WO 2018/131322 | A1 | 7/2018 |
| WO | WO 2019/099409 | A1 | 5/2019 |
| WO | WO 2019/125545 | A1 | 6/2019 |
| WO | WO 2019/133533 | A1 | 7/2019 |
| WO | WO 2023/244513 | A1 | 12/2023 |

OTHER PUBLICATIONS

U.S. Appl. No. 18/752,307, Dynamic Geofence Generation and Adjustment for Asset Tracking and Monitoring, filed Jun. 24, 2024.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
"Cargo Monitor", Samsara Inc., accessed Feb. 21, 2024 [publication date unknown], in 2 pages. URL: https://www.samsara.com/products/models/cargo-monitor.
"Connect your operations on the Samsara Platform.", Samsara Inc., [publication date unknown]. URL: https://www.samsara.com/products/platform/?gad_source=1&gclid=

EAlalQobChMI14DWofYgwMVaymtBh36cwx9EAAYASAAEgKJU ID_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.
"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.
"Driver Speed Management for Fleets—Monitoring Speeding in your fleet to increase safety and lower costs", Lytx, 2018, in 9 pages. URL: https://web.archive.org/web/20181217230050/https://www.lytx.com/en-us/fleet-services/program-enhancements/speed-management-for-fleets.
"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"EM21—Environmental Monitor", Samsara Inc., accessed Feb. 21, 2024 [publication date unknown], in 5 pages. URL: https://www.samsara.com/uk/products/models/em21/.
"Fast Facts: Electronic Logging Device (ELD) Rule", Federal Motor Carrier Safety Administration, U.S. Department of Transportation, Jun. 2017, Document No. FMCSA-ADO-17-003 (filed with 2Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco: Drive system", Fleet World, 2010, in 3 pages. URL: https://fleetworld.co.uk/fiat-launches-fleet-specific-ecodrive-system/.
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"Fuelopps" [archived webpage], Propel It, archived on Nov. 14, 2017, in 3 pages. URL: https://web.archive.org/web/20171114184116/http://www.propelit.net:80/fuelopps2.

(56)                  References Cited

OTHER PUBLICATIONS

"Guide: Drive risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 22 pages.

"Introduction Pack", Drivecam, Inc., 2012, in 32 pages. URL: https://www.iae-services.com.au/downloads/DriveCam-Introduction-Pack.pdf.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.

"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.

"Making roads safer for everyone, everywhere", Light Metrics, 2023, in 8 pages. URL: https://www.lightmetrics.co/about-us.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Nauto—Getting Started", Manualslib, Nauto, Inc., Apr. 20, 2017, in 18 pages. URL: https://www.manualslib.com/manual/1547723/Nauto-Nauto.html.

"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.

"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.

"Netradyne Vision based driver safety solution—Model Name: Driver I, Model No. DRI-128-TMO" [device specification], [pub-lication date unknown], in 4 pages. URL: https://device.report/m/4dd89450078fa688b333692844d3bde954ddfbaf5c105c9d1d42dfd6965cbf1b.pdf.

"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.

"Our Products" [archived webpage], Propel It, archived on Aug. 3, 2018, in 2 pages. URL: https://web.archive.org/web/20180803052120/http://www.propelit.net:80/our-products-1.

"Our Products" [archived webpage], Propel It, archived on Aug. 3, 2018, in 2 pages. URL: https://web.archive.org/web/20180803052120/http://www.propelit.net:80/our-products-1 (Motive-ITC-1393-0024677).

"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Safetyopps" [archived webpage], Propel It, archived on Nov. 14, 2017, in 3 pages. URL: https://web.archive.org/web/20171114183538/http://www.propelit.net:80/safetyopps2.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?%5B0%5D=Samsara&t%5B1%5D=Telematics&t%5B2%5D=Connectivity&curl=1.

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

(56) References Cited

OTHER PUBLICATIONS

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.

"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

"The 2012 Fiat 500: eco:Drive", Fiat500USA.com, Feb. 14, 2011, in 24 pages. URL: http://www.fiat500usa.com/2011/02/2012-fiat-500-ecodrive.html.

"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Vezo 360 Dash Cam—Capture Every Single Angle in Crisp Detail", ArVizon, 2019, in 13 pages. URL: https://www.arvizon.com/vezo-360-dash-cam/.

"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.

"The Home of Actionable Transportation Insights—Meet Altitude", Geotab ITS, accessed on Apr. 1, 2024 [publication date unknown], in 5 pages. URL: https://its.geotab.com/altitude/.

"Transform your business with the Connected Operations™ Cloud", Samsara Inc., accessed Feb. 21, 2024 [publication date unknown], in 8 pages. URL: https://www.samsara.com/products/platform/#impact0.

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 1 page.

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.

Amazon Web Services, "How Nauto is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.

Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.

AutoMotoTV, "Fiat ecoDrive System" [video], YouTube, Oct. 6, 2008, screenshot in 1 page URL: https://www.youtube.com/watch?v=AUSb2dBBI8E.

Batchelor, B. et al., "Vision Systems on the Internet", Proc. SPIE 6000, Two- and Three-Dimensional Methods for Inspection and Metrology III, Nov. 2005, vol. 600003, in 15 pages.

Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.

Bendix, "Bendix® Wingman ® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.

Bendix, "Quick Reference Catalog", Bendix Commercial Vehicle Systems LLC, 2018, in 165 pages. URL: https://www.bendix.com/media/home/bw1114_us_010.pdf [uploaded in 2 parts].

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, . et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b6 99489f50a4d27b81f1726ab4f55b3ac98b573a286594dc54.pdf.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", MacMillan Encyclopedia of Cognitive Science, 2006, vol. 4, London: MacMillan, in 6 pages (pp. 453-458). Downloaded from https://onlinelibrary.wiley.com/doi/10.1002/0470018860.s00054.

Dunn, B., "What is the Lytx DriveCam?", Autobytel, Jul. 12, 2014, in 1 page. URL: https://www.autobytel.com/what-is-lytx-drivecam.

Ekström, L., "Estimating fuel consumption using regression and machine learning", KTH Royal Institute of Technology, Degree Project in Mathematics, 2018, in 126 pages.

Engelbrecht, J. et al., "A Survey of Smartphone-based Sensing in Vehicles for ITS Applications", IET Intelligent Transport Systems, Jul. 2015, vol. 9(10), in 23 pages.

(56) References Cited

OTHER PUBLICATIONS

Fiat, "Interview to Giorgio Neri: videotutorial eco: Drive" [video], YouTube, Dec. 1, 2010, screenshot in 1 page. URL: https://www.youtube.com/watch?v=XRDeHbUimOs&t=27s.

FiatFranco, ""Ciao!"—Fiat ecoDrive" [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.

Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.

Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Gilman, E. et al., "Personalised assistance for fuel-efficient driving", Transportation Research Part C, Mar. 2015, pp. 681-705.

Ginevra2008, "Fiat EcoDrive" [video], YouTube, Mar. 7, 2008, screenshot in 1 page. URL: https://www.youtube.com/watch?v=D95p9Blir90.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Groover, M. P., Automation, Production Systems, and Computer-Integrated Manufacturing, 2015, 4th Edition, Pearson, in 811 pages.

Groover, M. P., *Automation, Production Systems, and Computer-Integrated Manufacturing*, 2016, 4th Edition (Indian Subcontinent Adaptation), Pearson, in 11 pages.

Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.

Han, Z. et al., "Design of Intelligent Road Recognition and Warning System for Vehicles Based on Binocular Vision", IEEE Access, Oct. 2018, vol. 6, pp. 62880-62889.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages URL: https://trucktrailertracker.com/keeptruckin-asset-gateway-review/.

Haworth, N. et al., "The Relationship between Fuel Economy and Safety Outcomes", Monash University, Accident Research Centre, Dec. 2001, Report No. 188, in 67 pages.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.

Huang, K.-Y. et al., "A Novel Machine Vision System for the Inspection of Micro-Spray Nozzle", Sensors, Jun. 2015, vol. 15(7), pp. 15326-15338.

Huff, A., "Lytx DriveCam", CCJDigital, Apr. 4, 2014, in 12 pages. URL: https://www.ccjdigital.com/business/article/14929274/lytx-drivecam.

Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.

Junior, J. F. et al., "Driver behavior profiling: An investigation with different smartphone sensors and machine learning", PLoS One, Apr. 2017, vol. 12(4): e0174959, in 16 pages.

Khan, M., "Why and How We Measure Driver Performance", Medium, Jan. 14, 2020. URL: https://medium.com/motive-eng/why-and-how-we-measure-driver-performance-768d5316fb2c#: ~: text= By%20studying%20data%20gathered%20from,the%20driver%20a% 20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Kwon, Y. J. et al., "Automated Vision Inspection in Network-Based Production Environment", International Journal of Advanced Manufacturing Technology, Feb. 2009, vol. 45, pp. 81-90.

Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.

Lekach, S., "Driver safety is 'all talk' with this AI real-time road coach", Mashable, Aug. 3, 2018, in 11 pages. URL: https://mashable.com/article/netradyne-driveri-ai-driver-safety.

Lotan, T. et al., "In-Vehicle Data Recorder for Evaluation of Driving Behavior and Safety", Transportation Research Record Journal of the Transportation Research Board, Jan. 2006, in 15 pages.

Lytx, "TeenSafe Driver Program", American Family Insurance®, 2014, in 10 pages. URL: https://online-sd02.drivecam.com/Downloads/TSD_WebsiteGuide.pdf.

Malamas, Elias N. et al. "A survey on industrial vision systems, applications and tools", Image and Vision Computing, Dec. 28, 2002, vol. 21, pp. 171-188.

Meiring, G. et al., "A Review of Intelligent Driving Style Analysis Systems and Related Artificial Intelligence Algorithms", Sensors, Dec. 2015, vol. 15, pp. 30653-30682.

Mitrovic, D. et al., "Reliable Method for Driving Events Recognition", IEEE Transactions on Intelligent Transportation Systems, Jun. 2005, vol. 6(2), pp. 198-205.

Motive Help Center, "New Fleet Managers Start Here—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date

(56) References Cited

OTHER PUBLICATIONS unknown], in 10 pages. URL: https://helpcenter.gomotive.com/hc/en-us/articles/6190688664733-How-to-create-Alert-for-Geofence.

Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.

Motive Help Center, "How to Manage a Group and Sub-groups", Motive Technologies, Inc., accessed on Oct. 24, 2023 [publication date unknown], in 4 pages. URL. https://helpcenter.gomotive.com/hc/en-us/articles/6189047187997-How-to-Manage-A-Group-and-Sub-groups.

Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.

gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/ho/en-us/articles/6189410468509-How-to-view-a-Safety-Event.

Motive Help Center, "How to view Fleet Drive Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group Drive Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver Drive Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view the Safety Hub and Drive Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-

(56)           References Cited

OTHER PUBLICATIONS

Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is Drive Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score.

Motive Help Center, "What is Drive Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score-(filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity.

Motive Help Center, "What is Fuel Hub?", Motive Technologies, Inc., accessed on Feb. 5, 2024 (publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors.

Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: AI Model Development", Motive Technologies, Inc., accessed on Mar. 29, 2024 [publication date unknown], Document No. 2022Q1_849898994, in 14 pages.

Motive, "Guide: Drive risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 2 pages. URL: https://www.youtube.com/watch?v=WnclRs_cFw0.

(56) References Cited

OTHER PUBLICATIONS

Motive, "How to install your Motive AI Dashcam." [video], YouTube, Aug. 5, 2022, screenshot in 2 pages. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive in 5 pages. URL: https://gomotive.com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive, "KeepTruckin ELD Training for Drivers" [video], YouTube, Feb. 2, 2018, screenshot in 1 page. URL: https://www.youtube.com/watch?v=LKJLIT2bGS0.

Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Motive, "Motive Fleet View | Advanced GPS system for live and historical fleet tracking." [video], YouTube, Jan. 23, 2023, screenshot in 1 page. URL: https://www.youtube.com/watch?v=CSDIDZhjVOQ.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

Motive, "Motive Reefer Monitoring for cold chain logistics." [video], YouTube, Oct. 5, 2022, screenshot in 1 page. URL: https://www.youtube.com/watch?v=rDwS5AmQp-M.

Motive, "Motive Smart Load Board—designed to help you find the right loads faster." [video], YouTube, Nov. 28, 2022, screenshot in 1 page. URL: https://www.youtube.com/watch?v=UF2EQBzLYYk.

Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.

Motive, "No time for downtime—automate fleet maintenance schedules" [video], YouTube, Dec. 20, 2022, screenshot in 1 page. URL: https://www.youtube.com/watch?v=flUccP-ifaU.

Motive, "Product Brief: Driver Safety", Motive Technologies, Inc., accessed on Oct. 24, 2023 [publication date unknown], Document No. 2023Q2_1204527735206670, in 4 pages.

Motive, "Product Brief: System Overview", Motive Technologies, Inc., accessed on Oct. 24, 2023 [publication date unknown], Document No. 2022Q4_1203331000367178, in 4 pages.

Motive, "Product Brief: Tracking & Telematics", Motive Technologies, Inc., accessed on Oct. 24, 2023 [publication date unknown], Document No. 2022Q3_1202933457877590, in 4 pages.

Motive, "Products | AI Dashcam—Smart, accurate, and responsive AI dash cams.", Motive Technologies, Inc., [publication date unknown].

URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 7 pages.

Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.

Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.

Motive, "Products | Driver Safety—Protect your fleet and profits with an all-in-one safety solution."; Motive Technologies, Inc., accessed on Feb. 18, 2024 [publication date unknown], in 13 pages. URL: https://gomotive.com/products/driver-safety/.

Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 16 pages.

Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 12 pages.

Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.

Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.

Motive, "Spec Sheet: AI Dashcam", Motive Technologies, Inc., accessed on Oct. 24, 2023 [publication date unknown], Document No. 2022Q3_1202788858717595, in 5 pages.

Motive, "Spec Sheet: Asset Gateway", Motive Technologies, Inc., accessed on Mar. 15, 2023 [publication date unknown], Document No. 2022Q1_849551229, in 6 pages.

Motive, "Take control of your fleet with Groups and Features Access.", Motive Technologies, Inc., Apr. 4, 2017, in 3 pages. URL: https://gomotive.com/blog/take-control-fleet-groups-features-access/.

Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j61.

Motive, "The most accurate AI just got better.", Motive Technologies, Inc., Mar. 8, 2023, in 8 pages. URL: https://gomotive.com/blog/fewer-fleet-accidents-with-the-new-ai/.

Motive, "The Motive Driver App: Change current duty status in your driving log." [video], YouTube, Aug. 10, 2022, screenshot in 2 pages. URL: https://www.youtube.com/watch?v=m4HPnM8BLBU.

Motive, "The Motive Driver App: Claim and correct unidentified trips." [video], YouTube, Sep. 13, 2022, screenshot in 1 page. URL: https://www.youtube.com/watch?v=z2_kxd3dRac.

Motive, "The Motive Driver App: Connect to the Vehicle Gateway." [video], YouTube, Sep. 13, 2022, screenshot in 1 page. URL: https://www.youtube.com/watch?v=egZmLYDa3kE.

Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.

Motive, "The Motive Driver App: Digitally record hours of service (HOS). " [video], YouTube, Aug. 10, 2022, screenshot in 1 page. URL: https://www.youtube.com/watch?v=gdexlb_zqtE.

Motive, "The Motive Driver App: Insert past duty driving log status." [video], YouTube, Aug. 10, 2022, screenshot in 1 page. URL: https://www.youtube.com/watch?v=TmOipFKPBeY.

(56)     References Cited

OTHER PUBLICATIONS

Motive, "The Motive Driver App: Switch to DOT inspection mode to share driving logs." [video], YouTube, Aug. 10, 2022, screenshot in 1 page. URL: https://www.youtube.com/watch?v=S2LR1ZUlmBU.

Motive, "The Motive Driver App: View hours of service (HOS) violations." [video], YouTube, Aug. 10, 2022, screenshot in 2 pages. URL: https://www.youtube.com/watch?v=qJX2ZiBGtV8.

Motive, "U.S. speed limits. What drivers and fleets need to know.", Motive Technologies, Inc., Jan. 13, 2022, in 8 pages. URL: https://gomotive.com/blog/us-speed-limits-for-drivers/.

Motive, "What is an AI dashcam?", Motive Technologies, Inc., Jan. 21, 2022, in 6 pages. URL: https://gomotive.com/blog/what-is-ai-dashcam/.

Motive, "WiFi Hotspot sets you free from restrictive cell phone data plans.", Motive Technologies, Inc., Jun. 27, 2019, in 5 pages. URL: https://gomotive.com/blog/wifi-hotspot/.

Motive, "WiFi Hotspot", Motive Technologies, Inc., accessed on Feb. 18, 2024 [publication date unknown], in 5 pages. URL: https://gomotive.com/products/wifi-hotspot/.

Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.

Nauto, "How Fleet Managers and Safety Leaders Use Nauto" [video], YouTube, Jan. 25, 2018, screenshot in 1 page. URL: https://www.youtube.com/watch?v=k_iX7a6j2-E.

Nauto, "The New World of Fleet Safety—Event Keynote" [video], YouTube, Jul. 9, 2020, screenshot in 1 page. URL: https://www.youtube.com/watch?v=IMOab90w_CY.

Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.

Netradyne India, "Netradyne Driveri Covered in BBC Click" [video], YouTube, Jan. 25, 2018, screenshot in 1 page. URL: https://www.youtube.com/watch?v=jhULDLj9iek.

Netradyne presentation, Netradyne, Oct. 2016, in 23 pages.

Netradyne, Driver•i™M Catches No Stop ad Stop Sign | Fleet ManagementYouTube, Oct. 3, 2017, screenshot in 1 page. URL: https://www.youtube.com/watch?v=18sX3X02aJo.

Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.

Netradyne, Driver Card 1, 2018, in 2 pages (ND_ITC_0001—ND_ITC_0002).

Netradyne, Driver Card 2, 2018, in 2 pages (ND_ITC_0003—ND_ITC_0004).

Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005—ND_ITC_0006).

Ohidan, A., "Fiat And AKQA Launch Eco:Drive ™", Science 2.0, Oct. 7, 2008, in 4 pages. URL: https://www.science20.com/newswire/fiat_and_akqa_launch_eco_drive_tm.

Perez, L. et al., "Robot Guidance Using Machine Vision Techniques in Industrial Environments: A Comparative Review", Sensors, Mar. 2016, vol. 16(3), in 27 pages.

Puckett, T. et al. "Safety Track 4B-Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.

Ramkumar, S. M. et al., "Chapter 14 Web Based Automated Inspection and Quality Management", in Web-Based Control and Robotics Education, 2009, ed., Spyros G. Tzafestas, Springer, in 42 pages.

Ruiz, J. F. et al., "A Lifecyle for Data Sharing Agreements: How it Works Out", In Schiffner, S et al. (eds.), *Privacy Technologies and Policy*, APF 2016, vol. 9857, 2016, pp. 3-20.

Tzafestas, S. G. (ed.), *Web-Based Control and Robotics Education*, 2009, Springer, ISBN 978-90-481-2504-3, in 362 pages. [uploaded in 3 parts].

Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.

Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 7, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm45856414558016332384295787004 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

Samsara, "AI Dash Cams", Samsara, Inc., [publication date unknown] (filed with Feb. 8, 2024 ITC Complaint, In the Matter of Certain

(56) References Cited

OTHER PUBLICATIONS

Vehicle Telematics, Fleet Management, and Video-Based Safety Systems, Devices, and Components thereof, Investigation No. 337-TA-1393), in 9 pages.

Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.

Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 8 pages.

Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.

Smart Dash Cam Vezo360!, "Vivek Soni Co-Founder at Arvizon" [video], YouTube, Feb. 21, 2019, screenshot in 1 page. URL: https://www.youtube.com/watch?v=1eclwRCb5ZA.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.

Soumik Ukil, "LightMetrics ADAS demo" [video], YouTube, Jul. 20, 2017, screenshot in 1 page. URL: https://www.youtube.com/watch?app=desktop&v=9LGz1oo7dTW.

Steger, C. et al., "Chapter 2 Image Acquisition" and "Chapter 3 Machine Vision Algorithms", in Machine Vision Algorithms and Applications, 2018, 2nd ed., Wiley, in 604 pages.

Steger, C. et al., Machine Vision Algorithms and Applications, 2018, 2nd ed., Wiley, in 60 pages.

Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.

Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.

Su, C.-C. et al., "Bayesian depth estimation from monocular natural images", Journal of Vision, 2017, vol. 17(5):22, pp. 1-29.

Sung, T.-W. et al., "A Speed Control Scheme of Eco-Driving at Road Intersections", 2015 Third International Conference on Robot, Vision and Signal Processing, 2015, pp. 51-54.

Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.

The Wayback Machine, "AT&T Fleet Complete—Give your Business a competitive advantage ", AT&T, 2019, in 12 pages. URL: https://web.archive.org/web/20190406125249/http:/att.fleetcomplete.com/.

The Wayback Machine, "Introducing Driver-| ™", NetraDyne, Sep. 22, 2016, in 4 pages URL: https://web.archive.org/web/20160922034006/http://www.netradyne.com/solutions.html.

The Wayback Machine, "NetraDyne's Driver-| ™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.

Top Fives, "15 Biggest Data Centers on Earth" [video], YouTube, Jun. 9, 2024, screenshot in 1 page. URL: https://www.youtube.com/watch?v=1LmFmCVTppo.

Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.

Vezo 360, "World's Smartest Dash Cam Powered by AI" [video], YouTube, Mar. 31, 2019, screenshot in 1 page URL: https://www.youtube.com/watch?v=M5r5wZozS0E.

Vlahogianni, E. et al., "Driving analytics using smartphones: Algorithms, comparisons and challenges", Transportation Research Part C, Jun. 2017, vol. 79, pp. 196-206.

Wahlstrom, J. et al., "Smartphone-based Vehicle Telematics—A Ten-Year Anniversary", IEEE Transactions on Intelligent Transportation Systems, Nov. 2016, vol. 18(10), in 23 pages.

Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.

Yufeng, Z. et al., "3G-Based Specialty Vehicles Real-Time Monitoring System", Applied Mechanics and Materials, Feb. 2014, vols. 513-517, pp. 871-875.

Yufeng, Z. et al., "3G-Based Specialty Vehicles Real-Time Monitoring System", Applied Mechanics and Materials, Feb. 2014, vols. 513-517, pp. 871-875, in 7 pages.

Zanini, M. et al., "Mobile Assets Monitoring for Fleet Maintenance", SAE International, Apr. 11-14, 2005, in 9 pages.

Zanini, M. et al., "Mobile Assets Monitoring for Fleet Maintenance", SAE International, 2005, pp. 369-375, in 8 pages.

Zhong, R. Y. et al., "Intelligent Manufacturing in the Context of Industry 4.0: A Review", Engineering, Oct. 2017, vol. 3, Issue 5, pp. 616-630.

U.S. Appl. No. 17/931,354, Power Optimized Geolocation, filed Sep. 12, 2022.

U.S. Appl. No. 19/310,480, Power Optimized Geolocation, filed Aug. 26, 2025.

U.S. Appl. No. 18/753,250, Anonymization in a Low Power Physical Asset Tracking System, filed Jun. 25, 2024.

U.S. Appl. No. 18/753,571, Dynamic Geofence Managment and Alerting for Asset Movement Monitoring, filed Jun. 25, 2024.

Driver I, The Power of Vision, Netradyne, [publication date unknown], in 2 pages.

"Fuelopps", Propel It, [publication date unknown], in 1 page.

"FuelOpps™ Delivers for Covenant Transportation Group—Improved driver behavior contributes to a 3+% MPG improvement in less than 12 months", FuelOpps by Propel IT, [publication date unknown], in 2 pages.

"FuelOpps™ Version 2.0" [presentation], Propel IT, Inc., [publication date unknown], in 17 pages.

"NetraDyne, an Artificial Intelligence Leader, Launches Driver-i™, a Vision-Based Platform, Focusing on Commercial Vehicle Driver Safety", Netradyne, [publication date unknown], in 2 pages.

"Safetyopps", Propel It, [publication date unknown], in 1 page.

"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.

"What is a ter-a-flop?", netradyne.com, [publication date unknown], in 2 pages.

U.S. Appl. No. 18/308,536, Ride Along Location Tracking, filed Apr. 27, 2023.

U.S. Appl. No. 18/468,463, Ride Along Location Tracking, filed Sep. 15, 2023.

U.S. Appl. No. 18/512,497, Ride Along Location Tracking, filed Nov. 17, 2023.

U.S. Appl. No. 19/310,480, Power Optimized Geolocation, Aug. 26, 2025.

U.S. Appl. No. 18/308,549, Low Power Geofencing, filed Apr. 27, 2023.

(56) References Cited

OTHER PUBLICATIONS

U.S. Appl. No. 18/468,478, Low Power Geofencing, filed Sep. 15, 2023.
U.S. Appl. No. 18/830,325, Connection Throttling in a Low Power Physical Asset Tracking System, filed Sep. 10, 2024.
U.S. Appl. No. 18/753,180, Packet Structure in a Low Power Physical Asset Tracking System, filed Jun. 25, 2024.
U.S. Appl. No. 19/051,058, Low Power Physical Asset Location Determination, filed Feb. 11, 2025.
U.S. Appl. No. 18/753,458, Providing Left-Behind Alerts Based on Real-Time Monitoring of Asset Groups, filed Jun. 25, 2024.
U.S. Appl. No. 18/753,571, Dynamic Geofence Management and Alerting for Asset Movement Monitoring, filed Jun. 25, 2024.
U.S. Appl. No. 18/753,948, Dynamic Asset Mismatch Detection and Notification, filed Jun. 25, 2024.
U.S. Appl. No. 19/203,895, Dynamic Geofence Generation and Adjustment for Asset Tracking and Monitoring, filed May 9, 2025.
U.S. Pat. No. 12,426,007, Power Optimized Geolocation, Sep. 23, 2025.
U.S. Pat. No. 12,150,186, Connection Throttling in a Low Power Physical Asset Tracking System, Nov. 19, 2024.
U.S. Pat. No. 12,256,021, Rolling Encryption and Authentication in a Low Power Physical Asset Tracking System, Mar. 18, 2025.
U.S. Pat. No. 12,450,329, Anonymization in a Low Power Physical Asset Tracking System, Oct. 21, 2025.
U.S. Pat. No. 12,253,617, Low Power Physical Asset Location Determination, Mar. 18, 2025.
U.S. Pat. No. 12,328,639, Dynamic Geofence Generation and Adjustment for Asset Tracking and Monitoring, Jun. 10, 2025.

* cited by examiner

```
struct packet
{
02 ⤳ var version;
04 ⤳ var productID;
06 ⤳ var flags;
08 ⤳ var transmitPower;
10 ⤳ var timeSinceConnection;
12 ⤳ var error;
14 ⤳ var firmwareVersion;
16 ⤳ var MAC;
18 ⤳ var temperature;
20 ⤳ var battery;
22 ⤳ var bootCount;
24 ⤳ var securityData;
};
```

FIG. 3

ENCODING AND TRANSMITTING SENSOR DATA IN LOW POWER BROADCASTS

TECHNICAL FIELD

Implementations of the present disclosure relate to gateway devices, low power sensors, systems, and methods that allow for sharing sensor data with decreased power requirements.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Tracking the location of unpowered assets can be important but presents several challenges as trackers often rely on battery power, which limits their ability to determine and report their locations frequently while also maintaining sufficient battery life. Further, transmitting information associated with assets, such as sensor data, is even more difficult in a low power setting.

SUMMARY

The systems, methods, and devices described herein each have several aspects, no single one of which is solely responsible for its desirable attributes. Without limiting the scope of this disclosure, several non-limiting features will now be described briefly.

Wireless communication technologies that allow devices to communicate over short distances with lower power consumption, such as Bluetooth Low Energy (BLE), may be used for many applications. However, transmitting sensor data typically requires establishing a connection between a peripheral and central, which can be inefficient and limit the flexibility of data transmission. Disclosed herein are systems and methods of transmitting sensor data via BLE broadcasts, without the need for a connection with a central. For example, sensor data (of any type and from any sensing device) may be transmitted via broadcasts (e.g., BLE advertisements), such as by using a Service Universally Unique ID (UUID) and a Tag-Length-Value (TLV) fields of BLE broadcast structure. The approaches discussed herein may allow efficient and flexible transmission of various types of sensor data, such as tire pressure, tank levels, accelerometer data, etc., in a connectionless manner.

As generally described herein, a central may be a device, such as a gateway (which may be powered or unpowered), that scans or observes for broadcasts from peripherals, such as over BLE (Bluetooth Low Energy). Centrals may log identifying information of peripherals. Combining the central's data (on the central and/or on the backend), the backend (or central) can compute an approximate location of the peripheral. A "central" may also be referred to herein as a "scanner," an "observer," and/or the like.

As also generally described herein, a peripheral may be a device that sends a broadcast (e.g., a BLE advertisement) that may be received by a central. In some implementations, a peripheral's communication functionality may only include BLE communication functionality. A peripheral's location may be determined and/or approximated by association with a central (the location of which may be known or provided by the central via, e.g., GPS functionality of the central), and may be stored (e.g., at a backend) and displayed on a user interface. A "peripheral" they also be referred to herein as an "advertiser," a "broadcaster," and/or the like.

As further generally described herein, the recording of a broadcast by a central may be referred to as an observation. Observations may be sent up to the backend via WiFi and/or cellular communications, and then associated with the latest GPS location of the central sent up by the central, and finally written to a statistics ("stats") stream as the peripheral's approximate location. In various implementations, this combined observation and location stat may be referred to as a proxy location for the peripheral. Further description and details are provided herein.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Backend (also referred to herein as "cloud," "backend server," "backend server system," and/or the like): one or more network-accessible servers configured to communicate with various devices, such as centrals (including, for example, vehicle gateways, asset gateways, industrial gateways, satellite gateways, and/or the like), sensor devices, and/or the like. For example, a backend may be configured to communicate with multiple gateways (e.g., vehicle gateways, asset gateways, and/or the like) associated with each of a fleet of hundreds, thousands, or more vehicles, assets, and/or the like. Similarly, a backend may be configured to communicate with multiple peripherals (e.g., asset tracking devices) attached to and/or corresponding to respective assets, vehicles, and/or the like. Additionally, a backend may be configured to communicate with multiple sensor devices (e.g., data sources, information sources, and/or the like). Such communication between a backend and peripherals, and/or a backend and sensor devices, may be provided via one or more centrals (e.g., gateways). Thus, the backend may have context and perspective that individual devices (including centrals, peripherals, and sensor devices) do not have. With reference to vehicles, for example, the backend may include data associated with a large quantity of vehicles, such as vehicles across a fleet or within a geographic area, which may be provided via various centrals, peripherals, and/or sensor devices. Thus, the backend may perform analysis of vehicle/asset data across multiple vehicles and between groups of vehicles (e.g., comparison of fleets operated by different entities). A backend may also include a feedback system that periodically updates event models used by centrals, peripherals, and/or sensor devices to provide immediate in-vehicle alerts, such as when the backend has optimized an event model based on analysis of asset data associated with many safety events, potentially across multiple fleets of vehicles.

Sensor (also referred to herein as a "Sensor Device"): an electronic device comprising one or more electronic components and configured to and/or capable of providing data and/or information (e.g., sensor data, sensed data, and/or the like). Sensor devices may be positioned in or on a vehicle and/or asset, and may be configured to communicate with a backend directly, and/or via a gateway. A sensor device can include one or more sensors, and/or be configured to communicate with one or more sensors, such as one or more video sensors, audio sensors, accelerometers, global positioning systems (GPS), and the like, which may be housed in a single enclosure (e.g., a dashcam, a device housing, and/or the like) or multiple enclosures. A sensor device may include a single enclosure that houses multiple sensors as well as communication circuitry configured to transmit sensor data to a backend and/or gateway. Alternatively, a sensor device may include multiple enclosures that may variously house sensors, circuitry, communications elements, and/or the like. Examples of sensor devices include dashcams, which may be mounted on a front window of a vehicle. A sensor device (e.g., dashcam) may be configured to acquire various sensor data, such as from one or more cameras, and communicate sensor data to a vehicle gateway, which can include communication circuitry configured to communicate with the backend. Sensor devices can also include memory for storing software code that is usable to execute one or more event detection models, such as neural network or other artificial intelligence programming logic, that allow the sensor device to trigger events without communication with the backend. In some implementations, a sensor device may be configured as a peripheral, which generally indicates that the sensor device is configured to transmit low power broadcasts to nearby centrals, such as via BLE. As discussed further herein, a sensor device may transmit a BLE broadcast including sensor data (e.g., sensor data), for example\.

Gateway (also referred to herein as "gateway device," "vehicle gateway," "VG," "asset gateway," "AG," "satellite gateway," and/or the like): an electronic device comprising one or more electronic components and configured to obtain and/or receive data and/or information, and communicate the data and/or information to and/or from a backend. gateways can include, for example, vehicle gateways (or "VGs"), which may be gateways associated with vehicles. Gateways can further include, for example, asset gateways (or "AGs"), which may be gateways associated with assets (e.g., trailers, containers, equipment, towers, mobile assets, and/or the like (and just to name a few)). Gateways can be positioned in or on vehicles/assets, and can be configured to communicate with one or more sensor devices, sensors, peripherals, and/or the like. Gateways can further be configured to communicate with a backend. gateways, (e.g., a vehicle gateway) can be installed within a vehicle by coupling an interface of the vehicle gateway to an on-board diagnostic (OBD) port of the vehicle. Gateways may include short-range communication circuitry, such as near field communication ("NFC"), Bluetooth ("BT"), Bluetooth Low Energy ("BLE"), and/or the like, for communicating with sensors, sensor devices, peripherals, and/or the like (which may, for example, be in a vehicle and/or other devices that are in proximity to the vehicle (e.g., outside of the vehicle)). Gateways can further include GPS receivers for determining a location of the gateway. Gateways can further include cellular and/or WiFi radios for communicating with a backend. In some implementations, a cellular and/or WiFi radio may be used to approximate the location of a gateway. Gateways may be configured as centrals, which generally indicates that the gateway is configured to scan, observe, and/or receive broadcasted packets from peripherals, such as using BLE communications, and provide such peripheral information to a backend. Gateways may, in some implementations, be configured to functional as peripherals, which generally indicates that the gateway is configured to suppress location determinations via GPS, and communications via LTE and/or WiFi, in favor of simpler communications with a central via short-range communications (e.g., via BLE), as described herein.

Central: any electronic device, such as a gateway, sensor device, mobile device, satellite, and/or the like, and/or functionality, that is configured to detect short-range communications (e.g., BLE advertisements/broadcasts) from peripherals. As used herein, the term "Central" may refer to the communication functionality of a device (e.g., the BLE communication functionality) or the term "Central" may refer to the device containing the BLE communication functionality. Thus, a central may refer to a gateway, sensor device, mobile device, and/or any other device that is configured with functionality to scan, observe, and/or receive broadcasted packets from peripherals. Further, these centrals (e.g., gateways of various types) are also configured to communicate with a backend. centrals further include functionality for determining a location of the central (e.g., GPS receiver, cellular radio, WiFi, and/or the like), which location can be communicated, e.g., to a backend. A location of a central can also be determined and/or specified by a user (e.g., via user-entered location/GPS pinning) or another system. Such alternative location determination may be useful for indoor/poor GPS signal locations.

Peripheral (also referred to herein as "asset tracking device," "object tracking device," and/or the like): any electronic device configured to be positioned in, on, near, and/or in association with, an asset, vehicle, and/or the like, and which is configured to communicate with centrals (e.g., gateways) via short-range communications (e.g., BLE). A peripheral may include short-range communication circuitry, such as near field communication ("NFC"), Bluetooth ("BT"), Bluetooth Low Energy ("BLE"), and/or the like, for communicating information to centrals. Typically, a peripheral is a dedicated, relatively simple electronic device which includes short-range communication circuitry, but not other communications circuitry, such as Wi-Fi or cellular radio. For example, in various implementations, the communications circuitry of a peripheral may include only BLE-related communications circuitry. In some implementations, and as described herein, a more complicated device, such as a gateway (e.g., an asset gateway), may function as a peripheral. For example, an asset gateway may be configurable to operate in a peripheral mode in which location determinations via GPS, and communications via LTE and/or WiFi, are suppressed in favor of simpler communications with a central via short-range communications (e.g., via BLE). Accordingly, a device, when operating as a peripheral, will utilize only functionality as if it were a dedicated peripheral device. As described herein, peripherals may advantageously require significantly less power to operate (as compared to, for example, a gateway under normal operations) and may therefore have extended battery life for an equivalent sized battery.

In some implementations, a peripheral may be a wearable device, such as a device that is worn or carried by a worker. In such an embodiment, sensor data associated with the worker, e.g., heart rate, body temperature, etc. may be transmitted via BLE broadcasts as discussed further herein.

In some implementations, a peripheral may include one or more sensors and the peripheral may be configured to transmit sensor data via BLE broadcasts, for example.

A peripheral may be configured to store information, such as sensor data, e.g., temporarily until the information is transmitted to a central.

In general, a peripheral communicates a limited amount of information, including an identification of the peripheral, via advertisements, to centrals (as further described herein). Advertisements transmitted by peripherals may also be referred to herein as "Bluetooth advertisements," "Bluetooth broadcasts," "BLE advertisements," "BLE broadcasts," "peripheral communications," "peripheral broadcasting packets," "broadcasted packets," "broadcast packets," "peripheral broadcasts," "broadcasts," and/or the like).

Various combinations of the above and below recited features, embodiments, and aspects are also disclosed and contemplated by the present disclosure.

Additional implementations of the disclosure are described below in reference to the appended claims and/or clauses, which may serve as an additional summary of the disclosure.

In various implementations, systems and/or computer systems are disclosed that comprise one or more computer readable storage mediums having program instructions embodied therewith, and one or more processors configured to execute the program instructions to cause the systems and/or computer systems to perform operations comprising one or more aspects of the above- and/or below-described implementations (including one or more aspects of the appended claims and/or clauses).

In various implementations, computer-implemented methods are disclosed in which, by one or more processors executing program instructions, one or more aspects of the above- and/or below-described implementations (including one or more aspects of the appended claims and/or clauses) are implemented and/or performed.

In various implementations, computer program products comprising one or more computer readable storage medium are disclosed, wherein the computer readable storage medium(s) has program instructions embodied therewith, the program instructions executable by one or more processors to cause the one or more processors to perform operations comprising one or more aspects of the above- and/or below-described implementations (including one or more aspects of the appended claims and/or clauses).

BRIEF DESCRIPTION OF THE DRAWINGS

The following drawings and the associated descriptions are provided to illustrate embodiments of the present disclosure and do not limit the scope of the claims. Aspects and many of the advantages of this disclosure will become more readily appreciated as the same become better understood by reference to the following detailed description, when taken in conjunction with the accompanying drawings, wherein:

FIG. 3 illustrates an example of at least a portion of a broadcast packet structure of Peripherals, according to various implementations.

EXAMPLE IMPLEMENTATIONS

Described below are further example implementations, features, and functionality of the system and associated components described above. These further example implementations, features, and functionality involve, consistent with the description provided above, communications among Peripherals, Centrals, and a backend.

Figure 1:
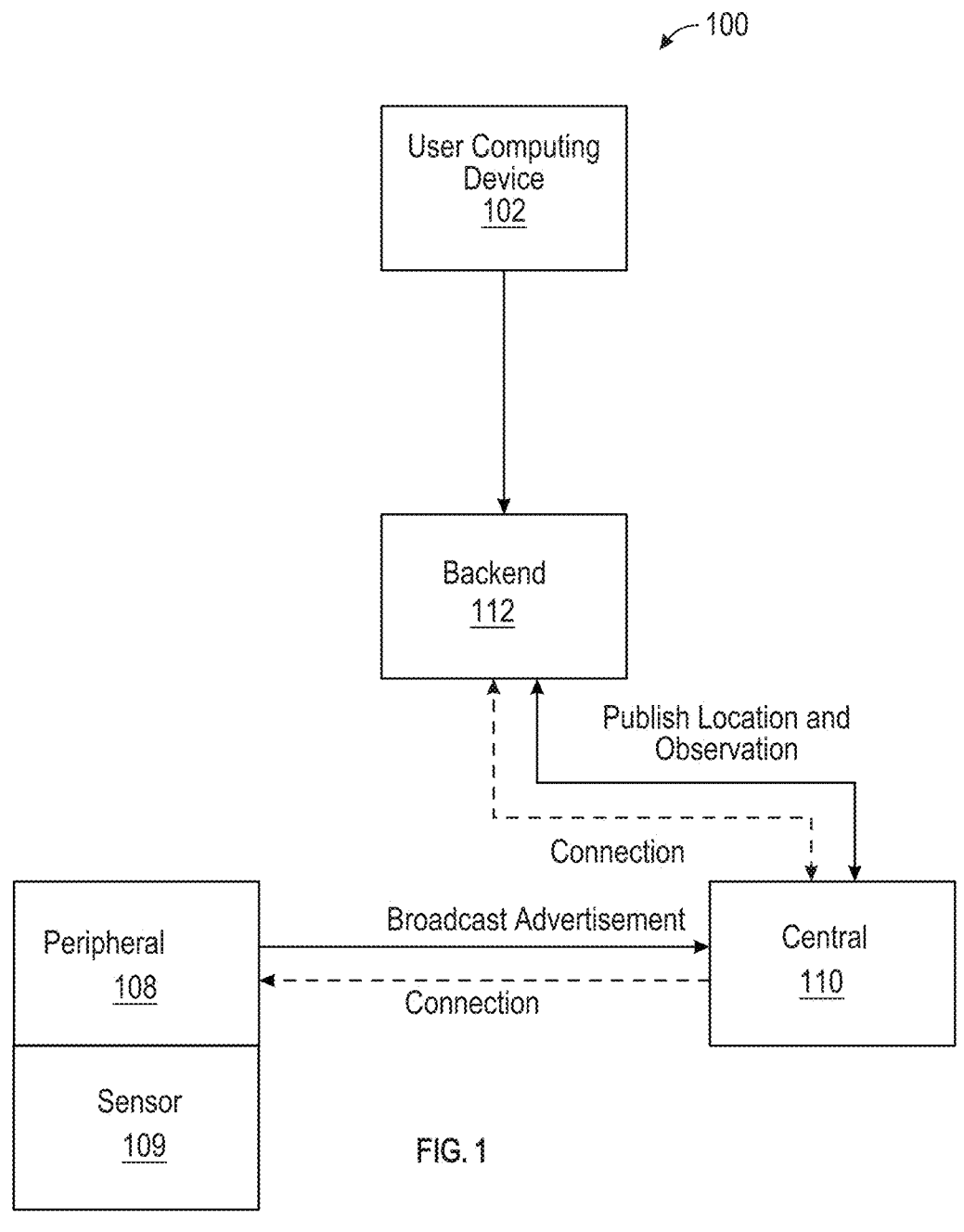
FIG. 1 is a block diagram illustrating an example operating environment of the system, including example communications among peripherals, centrals, and a backend.

FIG. 1 is a block diagram illustrating an example operating environment 100 of the system, including example communications among peripherals, centrals, and a backend. The communications may include protocols or methods of communication provided, in part, via Bluetooth communications, broadcasts, observations, and/or the like. The communications may further be paired with algorithms for interpreting Bluetooth observations and converting them to accurate location data. In the illustrated example, operating environment 100 includes one or more user computing devices 102, one or more peripherals 108, one or more centrals 110, and a backend 112.

In some implementations, user computing device 102 may be any mobile device, such as a mobile phone, tablet, laptop, desktop, and/or the like. In some implementations, user computing device 102 may be another system, component of a system, application programming interface (API), or other computing device that may communicate with the backend 112. The user computing device 102 may communicate with the backend 112 via a web interface or stand-alone application, such as via an application programming interface (API) configured to communicate with the backend 112. The user computing device 102 may communicate with the backend 112 via one or more networks, such as a local area network, wide area network (e.g., the internet), and/or the like. Communications may enable management of connected operations and allow users to monitor assets such as peripherals 108.

A central 110 may be a gateway (that may or may not be powered) that scans or observes broadcasts from peripherals 108, such as over BLE (Bluetooth Low Energy). In this example, the peripheral 108 is in communication with a sensor 109, such as a sensor that obtains sensor data (e.g., tire pressure, tank levels, accelerometer data, etc.) continuously, periodically, and/or on demand. As discussed further herein, the peripheral 108 may be configured to include sensor data in one or more broadcasts (e.g., BLE broadcasts) and the central 110 may be configured to extract and/or decode sensor data from received broadcasts.

The central 110 may log identifying information of one or more peripherals 108, which may be referred to herein as an observation stat. As discussed further below, data from a central 110, such as observations of peripherals 108, may be combined on the central 110 and/or on the backend 112. This may enable the backend 112 to compute an approximate location of a peripheral 108.

A peripheral 108 may be any device that sends a broadcast that may be received by a central 110. The communication functionality of a peripheral 108 may include BLE communication functionality. The location of a peripheral 108 may be determined and/or approximated by association with a central 110 (the location of which may be known or provided by the central 110 via, e.g., GPS functionality of the central 110), and may be stored (e.g., at the backend 112) and displayed on a user interface, such as those discussed herein.

A central 110 may be configured to geolocate itself using, for example, Global Positioning System (GPS) functionality, and/or the like. Additionally, the central 110 may be configured to record, or observe, broadcasts (also referred to herein as "advertisements") from a peripheral 108. A broadcast can be a specifically formatted message. A central 110 may send observations (e.g., received broadcasts) to the backend 112 via a network connection such as WiFi and/or cellular communications. The observations may then be associated with the latest GPS location of the central 110 as communicated by the central 110. This may allow the system to infer the location of a peripheral 108. For example, a central may report to the backend that it has received a broadcast from the peripheral 108 and is located at location L. The backend can then associate Location L (+/− an estimated distance between the central 110 and the peripheral 108) with the peripheral 108. In some cases, this inferred location may be referred to as a proxy location for the peripheral 108. This proxy location may be written to a statistics ("stats") stream as the approximate location of the peripheral 108.

In some implementations, the central 110 may perform self-geolocation and observations asynchronously at a firmware level. To ascertain a proxy location for the peripheral 108, the geolocation and observation stats may be matched based on timestamps. For example, when an observation is received at time t, a location that was collected as closely as possible to t may be associated with the peripheral 108. The central 110 and/or the backend 112 may be configured to match timestamps including in the stats.

Use of proxy locations for peripherals may provide various technical improvements to an asset tracking system. For example, the use of proxy locations may enable lower power requirements, providing for increased flexibility in the size of a peripheral 108, and the types of batteries installed, such as flight-safe batteries. Additionally, proxy locations enable simpler electronic design and a smaller form factor. Further, use of proxy locations may allow faster and/or more frequent location updates than other low-power consuming devices. Finally, proxy locations may be optimized through communication with out-of-organization centrals 110 (e.g., a peripheral may be managed by a different organization than the central) to provide a greater range of location coverage and improved location accuracy.

Timestamp matching may be handled at either the central or Backend. Implementing the matching at the backend may provide certain advantages. For instance, backend implementation may enable centralization of matching logic. If done at the central level, the matching logic may need to be written for each system-compatible device and/or firmware, which may create fragmentation. However, if performed at the backend, the same matching logic may be used for all devices. Additionally, backend matching may simplify the system communication protocol such that the central can simply listen for peripheral messages (e.g., broadcasts from peripherals) and forward them to the backend "as is". This can minimize code changes to make a gateway "enabled" for communications in the system and/or operating environment (e.g., "Crux Enabled"). Further, code written in the backend may be easier and faster to write, test, and deploy than firmware code for centrals. Also, while the centrals collect some data directly, the backend can access even more data, giving better perspectives for feature evolution, such as for cell and/or wifi-based geolocation, or interpolated locations).

Figure 2A:
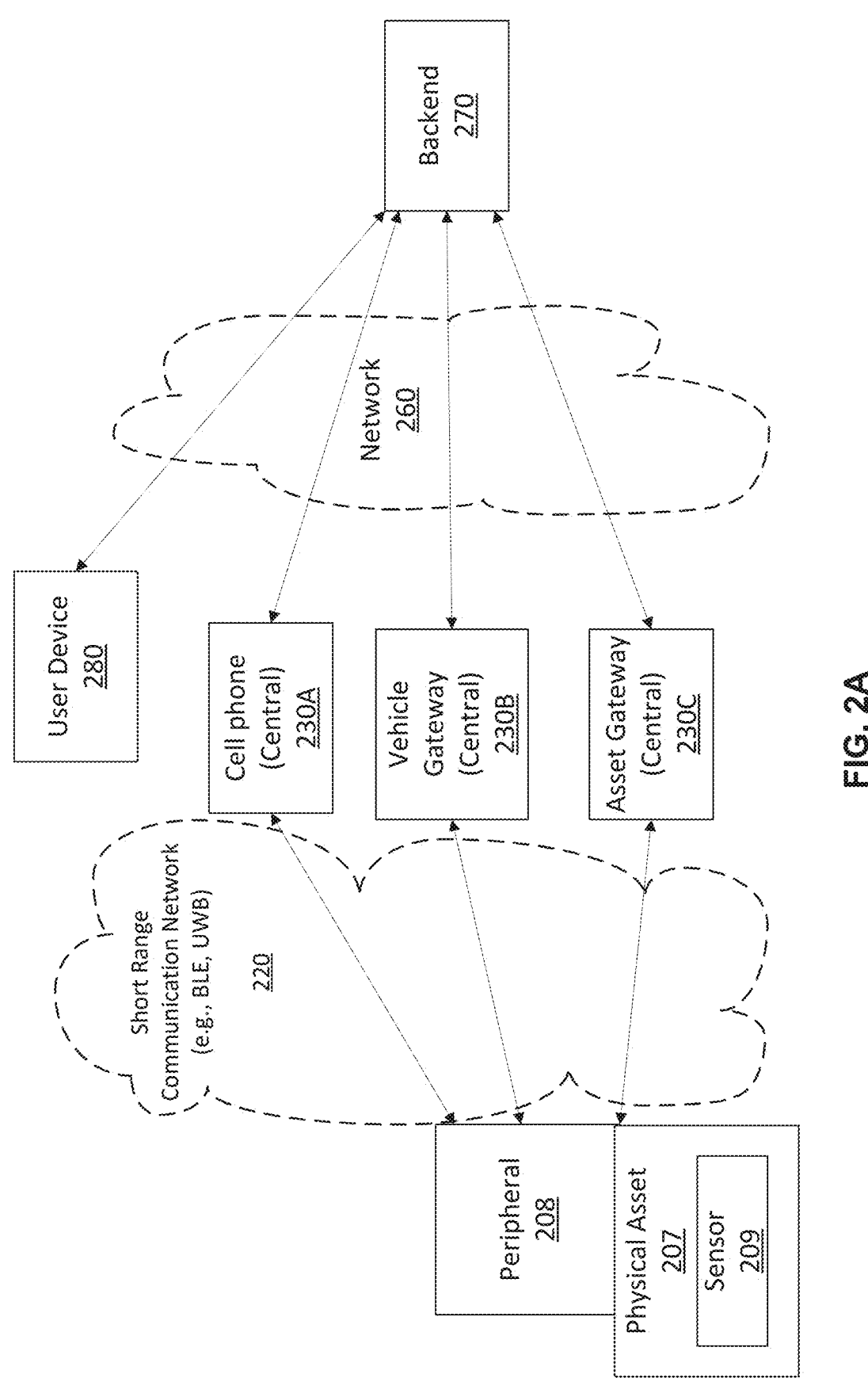
FIG. 2A is an example diagram showing communication of sensor data from a sensor, associated with a physical asset, to one or more centrals via a low power broadcast from peripheral.

FIG. 2A is an example diagram showing communication of sensor data from a sensor 209, associated with a physical asset 207, to one or more centrals 230 via a low power broadcast from peripheral 208. In the example of FIG. 2A, the peripheral 208 communicates with one or more centrals 230, such as a cell phone 230A, a vehicle gateway 230B, or an asset gateway 230 via a short range communication network, such BLE, UWB, and/or other short range communication. One or more centrals 230 detects a broadcast from the peripheral 208 and transmits information (e.g., sensor data, a location, and/or status of the peripheral 208) to the backend 270 via a network 260, such as any wired or wireless communication networks. Thus, the peripheral 208 reduces power requirements by using lower power short range communications, while still being able to communicate with the backend 270 via the centrals 230.

In some implementations, communication of sensor data may be redundant, e.g., through the use of multiple centrals 230. For example, sensor data at a first time may be received by the vehicle gateway 230B (and communicated to the backend 270) and sensor data at a later time may be received by the cell phone 230A (and communicated to the backend 270). This redundancy of communication paths increases a likelihood that broadcasts from any given peripheral are received by a at least one central.

Figure 2B:
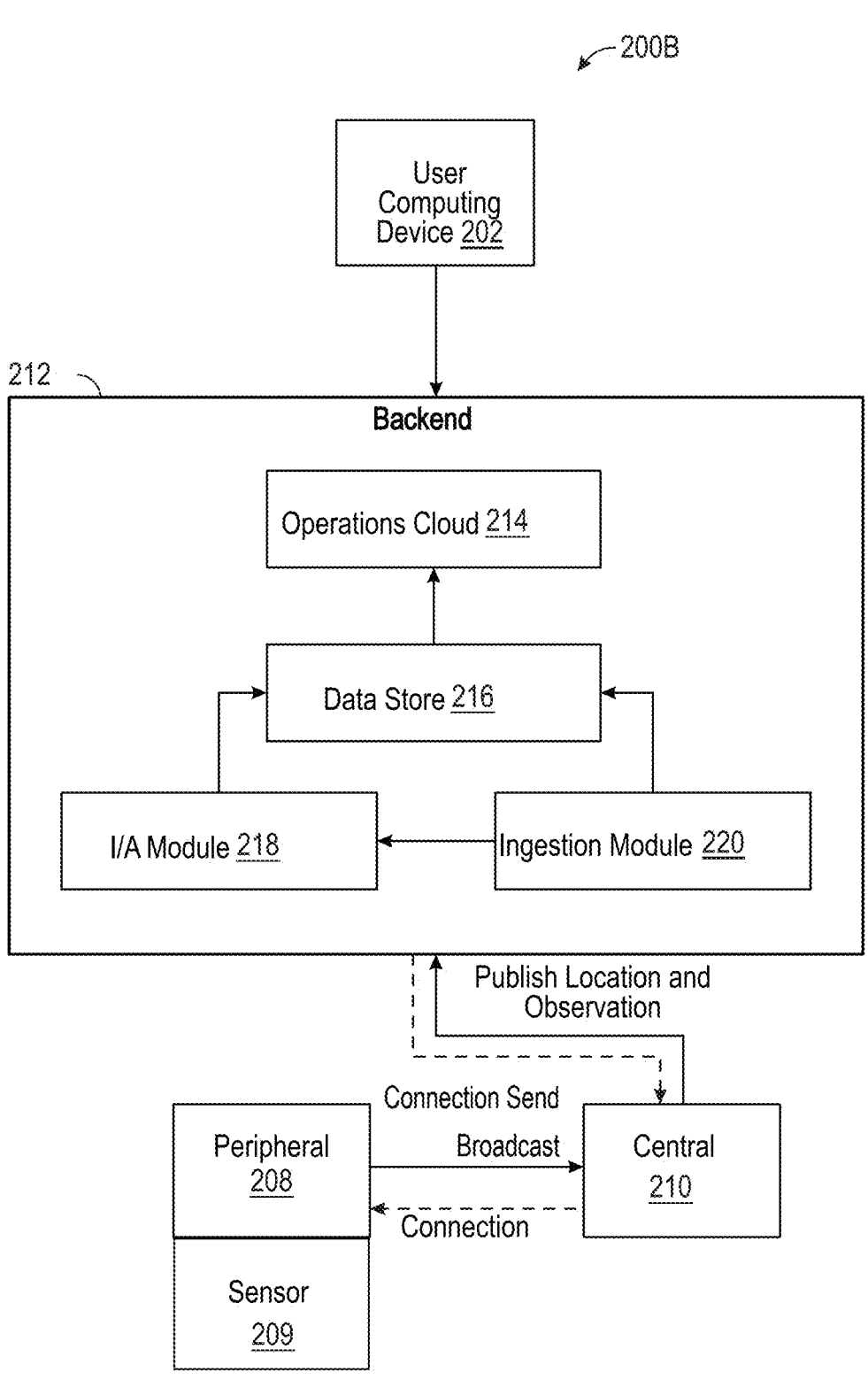
FIG. 2B is a block diagram illustrating a further example operating environment with additional details of an example backend.

FIG. 2B is a block diagram illustrating a further example operating environment 200B, which may be similar or the same as the operating environment of FIGS. 1 and 2A, with additional details of an example backend 212, as illustrated. In this example, operating environment 200B also includes one or more user computing devices 202, one or more peripherals 208 in communication with sensor 209, one or more centrals 210, and a backend 212. In this example, the backend 212 includes an operations cloud 214, a data store 216, an inference and aggregation (I/A) module 218, and an ingestion module 220.

The operations cloud 214 represents a system that communicates with physical assets, such as sensors associated with a fleet of vehicles, to provide comprehensive visibility into operations across an entire organization. This operations cloud 214 is configured to integrate with various physical operations, such as through communications with sensors and/or devices in industries such as construction, transportation and logistics, home and commercial services, food and beverage, local government, passenger transit, utilities, and/or the like. In the example of FIG. 2B, the operations cloud 214 is shown in communication with a user computing device 202. The user computing device 202 may be used by a user, such as a manager, supervisor, or employee of an organization. The user computing device 202 is configured to display interactive data to the user, including real-time dashboards that provide up-to-date information about the physical assets of the organization. This enables effective monitoring, management, and decision-making regarding physical assets.

The operations cloud 214 may utilize advanced data processing and analytics to aggregate and analyze data from diverse sources, ensuring accurate and actionable insights. It may support scalable and secure communication protocols to ensure reliable data exchange between the cloud and the physical assets. Additionally, the operations cloud 214 may be customized to meet specific operational needs of different industries, facilitating tailored solutions that enhance operational efficiency and productivity.

The data store 216 may be used to store time series data (and/or non-time series data) including, for example, information relating to locations of centrals 210 and peripherals 208 at various times. The operations cloud 214 may access data from the data store 216, such as to provide location data of centrals and peripherals to, e.g., users via various user interfaces of user computing device 202.

The details of the communications methods and processes may be encapsulated in peripheral/central firmware and an ingestion pipeline comprising the ingestion module 220 and the inference and aggregation ("I/A") module 218. The ingestion module 220 may be configured to receive observation and location information from centrals 210 as a data and/or statistics stream. The ingestion module 220 may write data and/or statistics directly to the data store 216 and communicate data and/or statistics to the I/A module 218.

The I/A module 218 may be configured to ingest data and/or statistics received from the ingestion module 220. The I/A module 218 may parse geolocation and observation stats to determine a timestamp for each event and match timestamps to determine proxy locations of the peripheral 208. For example, the I/A module 218 can record geolocation stats, each indicating locations of the central 210 at different times, and observation stats, each indicating specific Peripherals and times at which broadcasts were received. The I/A module 218 can parse these location and observation stats to determine a timestamp for each. The I/A module 218 can then match geolocation stats to observation stats, such as by determining whether timestamps of the corresponding geolocation and observation events match, e.g., an exact match or within a particular time threshold. Matched geolocation and observation stats can be used to infer a proxy location for the peripheral 208. This proxy location can be written to the data store 216 as the location for the peripheral 208. In some implementations, the proxy locations, as well as any encoded sensor data, may be used by the operations cloud 214 in the same manner as locations obtained via direct location determination of devices, such as via a GPS antenna. In some implementations, the operations cloud 214 may maintain distinctions between proxy and direct locations, such as to allow a user to selectively view proxy and/or direct locations of a peripheral on a map.

Figure 2C:
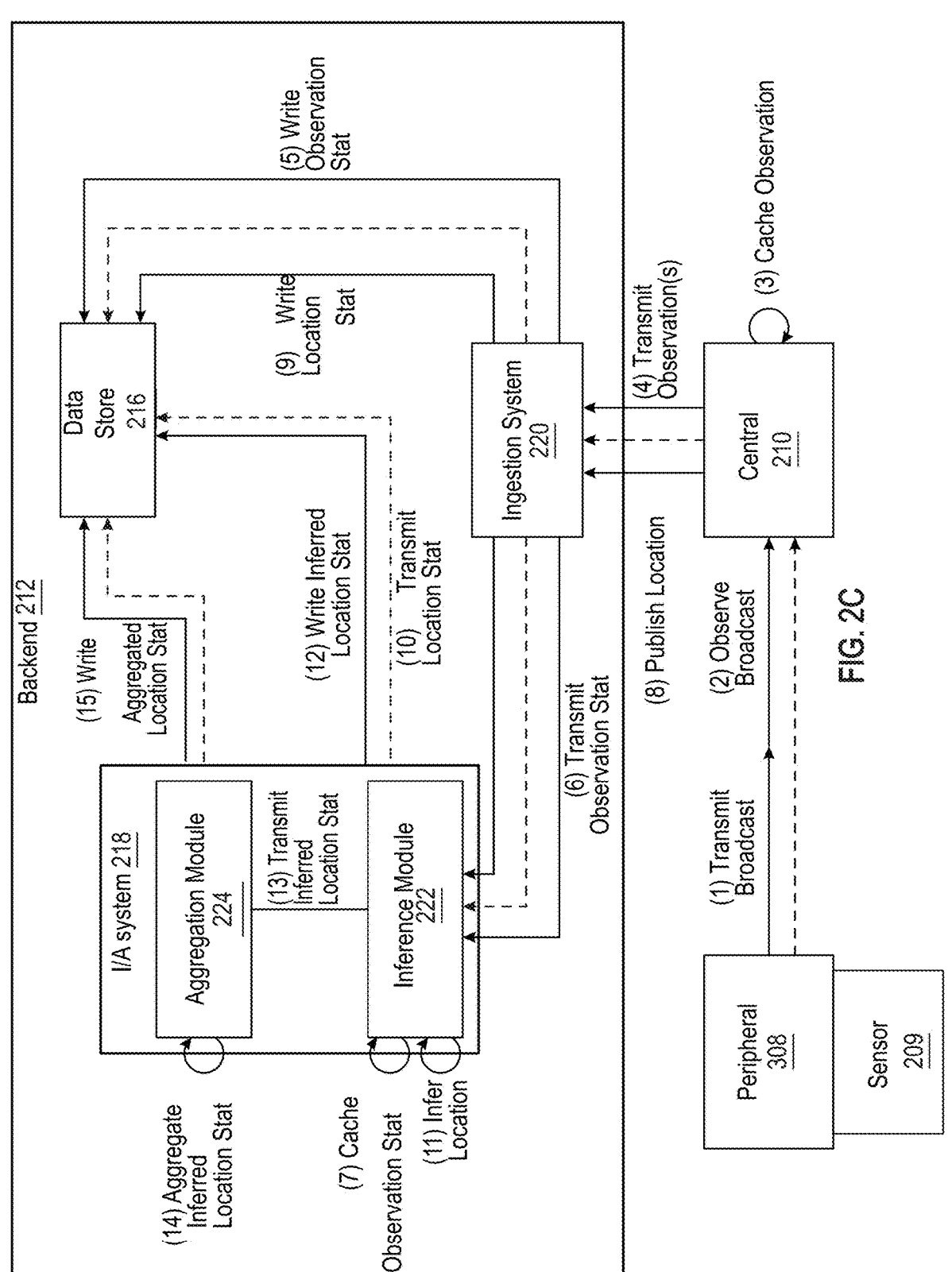
FIG. 2C is a block and data flow diagram illustrating further example implementation details of communications among various components of the system according to various implementations.

FIG. 2C is a block and data flow diagram illustrating further example implementation details of communications among various components of the system according to various implementations. In the illustrated example, the I/A module 218 includes an inference module 222 and an aggregation module 224. As discussed in further detail herein, the inference module 222 can receive observation and location data and/or statistics from the ingestion module 220, infer a location based on the received information, and write the inferred location to the data store 216 and/or provide to the aggregation module 224. The aggregation module 224 can receive inferred location statistics from the inference module 222, aggregate the received information, and write the aggregated location statistic to the data store 216.

An example implementation of the proxy location determination and aggregation is discussed below with reference to actions 1-14 illustrated in FIG. 2C. In various implementations, the processes may be performed by fewer or additional modules, and/or the processes may be performed in an order different than is illustrated.

In the example of FIG. 2C, at action (1) the peripheral 208 periodically broadcasts a Bluetooth broadcast, which may include sensor data from the sensor 209. Centrals 210, such as VGs, AGs, or mobile devices configured as centrals, can listen for and receive these broadcasts. A received broadcast may be referred to as an observation, and information associated with the observation as an observation stat. At action (2), the central 210 observes one or more broadcasts broadcast by the peripheral 208. At action (3), the central 210 temporarily stores, or caches, the observation(s), which may be combined with other observations before transmitting to the backend 212. Caching of individual observations can allow the central 210 to conserve cellular data that would otherwise be expended through constant or more frequent connection to the backend 212, such as by transmitting each individual observation to the backend 212. At action (4), the central 210 transmits the cached observations to the backend 212, such as to an ingestion module 220 of the backend 212 that performs stat ingestion operations.

At action (5), the ingestion module 220 receives the observations from the central 210 and writes the observations to the data store 216. Concurrent with action (5), at action (6) the ingestion module 220 transmits the observations to the inference module 222. In some implementations, the observations may be transmitted at different times to the inference module and the data store. In some implementations, the inference module 222 accesses observations from the data store 216, such that the ingestion module 220 may not need to separately send the observations directly to the inference module 222. At action (7) the inference module 222 caches the observations for association with a location of the central 210.

At action (8), the central 210 periodically provides its GPS location (e.g., at regular intervals or in response to a trigger, such as a change of location) to the backend 212, using the illustrated ingestion module 220. At action (9), the ingestion module 220 receives the location information (also referred to herein as "locations" or "location stat") and writes the location stat to the data store 216. Concurrent with action (9), at action (10) the ingestion module 220 transmits the location stat to the inference module 222. In some implementations, the locations may be transmitted at different times to the inference module and the data store. In some implementations, the inference module 222 accesses location stats from the data store 216, such that the ingestion module 220 may not need to separately send the location stats directly to the inference module 222.

At action (11), the inference module 222 uses the location and observation stats to infer a location of the peripheral 208. For example, the inference module 222 may use the timestamp matching processes described above with reference to FIG. 1, matching timestamps of location and observation stats to determine proxy locations of the peripheral 208. At action (12), the inference module 222 writes the inferred location to the data store 216.

At action (13), the inference module 222 transmits the inferred location to the aggregation module 224. Alternatively, the aggregation module 224 may access the inferred location from the data store 216. At action (14), the aggregation module 224 aggregates inferred locations of Peripherals. For example, the aggregation module 224 may identify multiple inferred locations of a peripheral 208 that may be triangulated to generate a more precise inferred location of the peripheral 208. For example, the ingestion module 220 may receive observations and location stats from a plurality of centrals 210 that correspond to a single peripheral 208. The inference module 222 may initially access this information and generate a plurality of inferred locations for the peripheral 208, such as one for each central 210. These inferred locations may then be accessed by the aggregation module 224, which may attempt to triangulate a location of the peripheral 208 based on the inferred locations.

In some implementations, the aggregation module 224 may receive information about the Bluetooth heuristics of the central 210 associated with each inferred location, such that for each inferred location a circular range in which the peripheral 208 may be located may be generated. The aggregation module 224 can utilize an algorithm and the generated ranges to triangulate a location of the peripheral 208. The aggregation module 224 may not use all inferred locations associated with the peripheral 208. For example, the aggregation module may use only inferred locations associated with a particular time range and discard any outside that range. For example, inferred locations for a peripheral with timestamps that are all within a time range of x seconds (e.g., 1, 2, 3, 4, 5, 10, 20, 30, or 60 seconds) may be used to determine an updated inferred location of the peripheral. In some implementations, the aggregation module 224 may use machine learning to determine which inferred locations to utilize in triangulation and in performing the actual triangulation of the peripheral 208 location. If an updated inferred location is determined for a peripheral, the aggregation module 224 may, at action (15), write the location stat to the data store 216.

Example Broadcast Packet Structure Features and Functionality

As noted above, broadcasts may include information that enables a central or Backend to determine a location (e.g., a proxy location) of a peripheral. In some implementations, broadcast/advertising packets may be transmitted at intervals (e.g., every 8 seconds, or some other interval). Each broadcast packet may have a specific format containing information such as: version information, product ID, transmit power level, connection timer, firmware version, status information, security data, and the like. In some implementations, the version information indicates a data structure of the broadcast packet. A product ID can help differentiate handling by the central. Transmit power may be embedded in the broadcast for ranging purposes. The transmit power can represent the peripheral's transmission power level. This transmit power may be used in conjunction with RSSI (Received Signal Strength Indicator) readings at the central to approximate distance between the central and the peripheral, e.g., by calculating a difference between the measured transmit power and received signal strength, taking into account path loss and other factors. A connection timer, as discussed above, can indicate time since a last connection of the peripheral to a central. Firmware version can allow tracking of firmware updates and changes. Status information can provide information on the peripheral such as the temperature and battery life of the peripheral. Status information may also include debugging information such as a number of attempts the peripheral has made to boot up. Security data may include information used for authentication purposes such as a nonce, counter, and/or signature, as described above.

In various implementations, the BLE standard for a broadcast packet structure may not be strictly followed for the broadcasts. The BLE standard permits broadcasting a certain number of bytes along with a header that includes the device identifier or MAC address (e.g., in a "BLE_ADDR" field). In some cases, certain devices (e.g., iOS devices) do not expose a MAC address field (e.g., the "BLE_ADDR" field) of the BLE broadcast packet. Thus, that MAC address field can be used for other purposes by other Centrals. For example, the MAC address field may be used store other information, such as battery status, remaining capacity, temperature, and other debugging information. The MAC address, or other ID of the peripheral or asset (e.g., the peripheral ID), may be included in the broadcast data in a different field.

FIG. 3 illustrates an example of at least a portion of a broadcast packet structure of Peripherals, according to various implementations. Certain of the elements of the broadcast packet structure are described herein in further detail.

A protocol version 302 can be used to inform the central and Backend about the structure of the packet and allows graceful changes to that structure at a later date if needed.

A product ID 304 may be included in the broadcast packet. While the combination of Universally Unique Identifier (UUID)+protocol version may be shared across all products that use a particular UUID, including the product ID 304 in the broadcast enables the option to deviate from this paradigm if needed, and for Centrals to act on broadcasts on a per-product basis. For example, by including the product ID 304, the central may not need to check the allowlist to determine whether to connect to certain Peripherals, such as Peripherals of particular types or organizations.

A flag indicator 306 may be a bitmask that can be used to denote something about the broadcast or state/feature of the device. For example, the flag indicator 306 may be used to denote whether the MAC address is in the broadcast and/or whether the MAC address has been encrypted.

A transmit power (TX power) indicator 308, can be used to determine RSSI. Higher TX power can typically correspond to higher RSSI. To determine an accurate distance approximation, Centrals can use TX power. The TX power indicator 308 may be in the form of a simple integer value, which may be translated to a particular dBm using a lookup table, which may be specific to a peripheral type. For example, the lookup table may consist of two columns, one including index values represented by the TX power indicator 308 in the broadcast packet, and the other indicating corresponding output power values in dBm. The lookup table may have a plurality of rows (e.g., 2, 5, 10, 30, 50, etc.) each associated with an index value and corresponding output power value or value range. In some implementations, the index values and output power values may correspondingly increase and/or decrease. In some implementations, the index values and output power values may inversely increase and/or decrease. In some implementations, the index values may be associated with output power values according to a different coordination scheme. The lookup table may have more or different columns. The lookup table may be used by the peripherals, the central, and/or the backend.

A time since connection indicator 310 can be used to communicate to Centrals how long it has been since a peripheral has been connected to. The value can be a simple integer, which may be translated to a particular range of time using a lookup table. For example, the lookup table may consist of two columns, one including a count represented by the connection indicator 310 in the broadcast packet, and the other indicating time periods since last connection corresponding to count values. For example, time periods may comprise specific amounts of time (e.g., 1 minute, 1 day, 1 hour, 1 week, etc.) or ranges of time (e.g., 1-10 minutes, 1-2 hours, 1-2 days, less than 1 hour, more than 3 weeks, etc.). Time periods may be measured in various units (e.g., minutes, hours, days, weeks, months, etc.). In some implementations, one or more values of the time periods columns may indicate that a peripheral has never been connected to, or that the time since last connection is unknown. The lookup table may have a plurality of rows (e.g., 2, 5, 10, 30, 50, etc.) each associated with a count value and corresponding time period indicator. The lookup table may have more or different columns. The lookup table may be used by the peripherals, the central, and/or the backend.

An error indicator 312 can be used to indicate errors. For example, errors may include whether a peripheral is malfunctioning, whether the peripheral's software has thrown an error, whether the peripheral failed to connect to a central, or the like.

A firmware version 314 can be compared against the firmware image the central has to help the central determine whether or not it should attempt to connect to perform an update. For example, if the firmware version 314 does not match the firmware image of the central, the central may determine that the peripheral requires an update and that it should connect to it.

In some cases, a MAC address 316 (e.g., a peripheral identifier) can be included in the packet. As mentioned above, certain devices (e.g., iOS devices) do not expose a MAC address field (referred to herein as "BLE_ADDR" field) of the BLE broadcast packet. By separately including the MAC address in the broadcast packet in a location other than BLE_ADDR, such devices can still be used with the peripherals. For example, the devices can execute an application for Peripheral detecting, finding, RSSI metering, and/or the like. In some implementations, a backend can receive a broadcast packet, identify that the peripheral identifier is in the broadcast packet in a location other than BLE_ADDR, and extract the peripheral identifier from the broadcast packet. As described here, the peripheral identifier may be encrypted. Similarly, the broadcast packed may be include a signature, as also described herein.

Since, in some cases, the MAC address is included in the broadcast packet in a different location than BLE_ADDR, the BLE_ADDR can be repurposed for other uses, such as for additional Peripheral monitoring information and/or debugging information, such as device temperature or battery level, or a boot count. In some cases where certain devices (e.g., iOS devices) do not expose the MAC address field, the device monitoring information and/or debugging information may be included in the broadcast packet rather than the MAC address field.

Monitoring information may include a temperature indicator 318 and a battery health indicator 320 to facilitate battery health monitoring. Operational ranges of interest related to the temperature indicator 318 and/or battery health indicator 320 can be determined and reported. The monitoring information may include more, less, or different fields.

Debugging information may include a boot count indicator 322 to facilitate corrective action if a peripheral is unable to boot normally after several attempts. The boot count indicator 322 can track how many times a peripheral has booted or attempted to boot. In some implementations, the boot count indicator 322 is a running counter and may reset at a predetermined value.

The security data 324 may include information used to authenticate a peripheral to the backend. For example, the security data 324 may comprise a nonce, counter, and signature as described above. In some implementations, the security data variable 324 may comprise more, less, or different security information.

In some implementations, an example broadcast packet can include: a MAC Address (gateway ID), Protocol Version, TX Power, Product ID, Battery Level & Temperature, Connection Metrics, Firmware Version, Configuration Version, Connection Scheme (including, e.g., shipping mode to customer mode transition), Boot Count, UUID and/or the like.

In general, the central can log some combination of: 1. The verbatim contents of the broadcast packet (which can include an encrypted MAC address); 2. BLE Service UUID; 3. BLE_ADDR, which may contain monitoring data as described herein; 4. RSSI; and 5. Other supportive information like how many observations were made in batching period (as described herein).

In general, while centrals are primarily configured to communicate peripheral information to the backend, they can also understand a portion of the advertisement/broadcast. This can allow the central to throttle the frequency at which it requests peripheral data in the allowlist (as described above). With this approach, the central may only ping the allowlist when it detects that a peripheral wants to be connected to (as opposed to constantly pinging the allowlist). In an implementation, the central may understand the following broadcast information: protocol version (to understand which structure is being used); firmware version; configuration version; connection scheme (including, e.g., shipping mode to customer mode transition); and/or TX power (used for distance approximation).

In some cases, the broadcast may have two UUID's, such that one of the UUID's can be reserved for future use. The system may use protocol version 302 for changes about the packet, and the flag indicator 306 to denote connectable vs. non-connectable and encrypted vs. non-encrypted.

Transmitting Sensor Data Via BLE Broadcasts

Sensor data (of any type and from any sensing device) may be transmitted via broadcasts (e.g., BLE advertisements), such as by using a Service Universally Unique ID (UUID) and a Tag-Length-Value (TLV) fields of BLE broadcast structure. For example, the peripherals 108, 208, 308 (FIGS. 1-3) may include sensor data in broadcasts. The Service UUID is a unique identifier that indicates the type of service being advertised, while the TLV structure allows for the encoding of arbitrary data in a compact and flexible format. A TLV structure typically comprises three components: a tag, a length, and a value. The tag identifies the type of data being transmitted, the length specifies the size of the data, and the value contains the actual data. This approach allows for efficient and flexible transmission of various types of sensor data, such as tire pressure, tank levels, accelerometer data, etc., in a connectionless manner.

In one example, consider a BLE Service UUID of 0xFCE6 (or 0b1111110011100110). Various types of sensor data can be encoded using different tags within the TLV structure. The following table provides an example of tags and corresponding 8-bit tag values:

| Description | 8-bit Tag Value |
| --- | --- |
| Invalid | 0 |
| Number of Logs to Upload | 1 |
| Unique Signature | 2 |
| Tire Pressure Monitor | 3 |
| Tank Level | 4 |
| Panic Button | 5 |
| Accelerometer | 6 |
| Door Monitor | 7 |
| Hall Sensor | 9 |

In other implementations, any other tags and values may be used.

An example of a broadcast, which may be limited to 31 bytes in some implementations, is provided below. In this example, after the tag, application-specific data can be included in the TLV format.

15

| Description | Value | Length of Data (in bytes) |
|---|---|---|
| Length | Total length of mfg-specific data (11) | 1 |
| Type (Mfg-Specific Data) | 0xFF | 1 |
| Tag for Logs to Upload | 1 | 1 |
| Length for Logs to Upload | 1 | 1 |
| Value for Logs to Upload | 7 | 1 |
| Tag for Unique Signature | 2 | 1 |
| Length for Unique Signature | 2 | 1 |
| Value for Unique Signature | 0xD842 | 2 |
| Tag for Tank Level | 4 | 1 |
| Length for Tank Level | 2 | 1 |
| Value for Tank Level | 173 | 2 |

In this example, the broadcast transmission indicates, in the three groups of TLV data, the following:

1. There are 7 logs to upload.
2. The unique signature is 0xD842.
3. The tank level value to upload is 173.

Advantageously, the connectionless nature of the broadcast reduces the need for establishing and maintaining connections, thereby conserving power and increasing the efficiency of data transmission. The flexible TLV structure allows for the encoding of various types of sensor data, making the system adaptable to a wide range of applications.

In some implementations, deduplication of data on the backend may be performed, such as to identify and consolidate sensor data received from multiple centrals at the same (or about the same) time. For example, the unique signatures and timestamps within the TLV structure of sensor data received from multiple centrals may be analyzed at the backend to identify and consolidate potentially duplicative sensor readings to improve data integrity and accuracy.

Coupling of Sensor Data from BLE Broadcasts with Central Location Information

As discussed herein, location of a peripheral may be estimated by associating locations of centrals that receive broadcasts from the peripheral with the peripheral. This coupling of central location data with peripherals may be extended to associate central location data with sensor data. Association of geolocation data from multiple centrals may significantly increase utility of sensor data by providing precise location information of each sensor reading. This location data may be important for various applications, such as monitoring fuel siphoning or associating tire pressure data with specific locations.

In some implementations, broadcasts from a peripheral are received by multiple centrals. Each central is capable of determining its own geolocation, which can be provided to the backend, along with information from the broadcast, including sensor data embedded in the broadcast. For example, each central may log received sensor data (included in broadcasts from peripherals) along with their geolocation data, and transmit to a backend for further processing.

The backend may aggregate the sensor data and geolocation data from multiple centrals to determine an estimated location of a particular peripheral, which may be referred to as a "proxy location" of the peripheral. For example, the backend may triangulate a position of a peripheral based on geolocation data from multiple centrals that received a broadcast from the peripheral.

The integration of geolocation data with sensor data—of any type—facilitates creation of time series data points that include both the sensor readings and their corresponding locations. This enriched dataset can be used for various analytical purposes, such as tracking the movement of assets, identifying patterns in sensor data, and generating alerts for abnormal conditions.

In an example implementation, a BLE peripheral may receive fuel level sensor data indicating fuel level of a vehicle fuel tank. The peripheral periodically transmits broadcasts to allow determination of proxy locations of the peripheral and to provide the fuel level data. Multiple centrals may receive these broadcasts (with embedded fuel level data) and log their respective geolocation data along with the sensor data. This observation data may then be transmitted to the backend, which may aggregate the multiple observations of the peripheral to determine a more precise location of the peripheral and corresponding fuel tank. The backend may monitor the fuel level of the fuel tank and, if a sudden decrease in fuel level is detected, trigger a fuel siphoning alert that indicates location of the fuel tank when the sudden decrease occurred. Having location of the fuel tank at the time of siphoning (or leakage or other event) may be important to identify and address potential theft or leakage issues.

In another example implementation, a BLE peripheral may receive tire pressure data from a tire pressure sensor. The peripheral periodically transmits broadcasts to allow determination of proxy locations of the peripheral and to provide the tire pressure data. Multiple centrals may receive these broadcasts (with embedded tire pressure data) and log their respective geolocation data along with the sensor data. This observation data may then be transmitted to the backend, which may aggregate the multiple observations of the peripheral to determine a more precise location of the peripheral and corresponding tire pressure sensor. The backend may monitor the tire pressure level and, if the tire pressure drops below a threshold, trigger a low tire alert hat may be useful in scheduling maintenance and/or avoiding further damage to the tires that may result from driving on low pressure tires.

In some implementations, any sensors, including third-party sensors from different manufacturers, that are capable of communicating with a peripheral and/or can transmit BLE broadcasts its (e.g., acting as a peripheral) may communicate sensor data via the low power communication system discussed herein. This device agnostic approach allows the system to accommodate a wide variety of sensors, regardless of their manufacturer or specific technology, thereby broadening the scope of applications and enhancing interoperability.

Offload of Backlogged Data

A peripheral may receive multiple sensor data values that are stored in internal memory that have not yet been transmitted to a central (and to a backend). For example, a peripheral may receive multiple sensor data values during an interval between broadcasts from the peripheral and/or while the peripheral is not in range of a central. Due to the limited size of BLE broadcasts (31 bytes for BLE4 and larger for BLE5 extended broadcasts), not all logged data may be transmitted in a single broadcast. Thus, the broadcast may include an indication of backlogged data that is interpreted by a received central to determine if a connection to the peripheral should be established, which enables offloading of the backlogged data via bi-directional communication. For example, when a peripheral's internal memory reaches a certain threshold, the next broadcast may include an indicator that there is backlogged data available for offload via connection with a central. This backlogged data indicator may be included in future broadcasts until a connection with a central is successfully established and the sensor data is offloaded.

In some implementations, timing and/or need for a connection with a central may be determined based on one or more of several factors. For example, high-priority data, such as safety-critical information, can trigger an immediate connection to allow timely delivery, while lower-priority data may be queued for transmission during optimal conditions to conserve power and resources. This dynamic management of data priorities may allow essential information to be communicated promptly, while also optimizing the system's efficiency and power usage.

In some implementations, communications from a peripheral may be temporarily "muted," or disabled, such as to preserve battery power. For example, a central may determine that a threshold quantity of sensor values for a predetermined time have been received from a peripheral and, accordingly, provide an instruction to the peripheral to turn off broadcasts for XX minutes. The decision to mute a peripheral may be determined based on other factors, such as frequency of changes in sensor data or importance of timing in receiving sensor data. For example, if sensor data from a particular sensor (or type of sensor) has remained relatively constant over a certain time period, and sensor data from that particular sensor (or type of sensor) is not time critical, the peripheral may be muted for a time period and/or the regular schedule of reporting sensor data in broadcasts for the sensor may be adjusted. In some implementations, an adaptive algorithm and/or artificial intelligence may be used by the peripheral and/or central to dynamically adjust a muting period based on real-time analysis of sensor data trends. This adaptive algorithm could predict periods of low data variability and automatically mute broadcasts during these times, optimizing power conservation. In some implementations, muting may be scheduled, such as during overnight or periods of known inactivity. In some implementations, the peripheral may make a determination to mute temporarily and/or adjust a broadcast schedule internally, e.g., without a connection with a central.

In one implementation, an offload indicator can be a specific tag within the TLV structure, such as a "Logs to Upload" tag, which specifies the number of logs that are available for offload. For example, the following TLV structure in a broadcast indicates that there are 7 logs (e.g., sensor time series values) to offload.

| Description | Value | Length of Data (in bytes) |
| --- | --- | --- |
| Tag for Logs to Upload | 1 | 1 |
| Length for Logs to Upload | 1 | 1 |
| Value for Logs to Upload | 7 | 1 |

Upon receiving this broadcast, a central may decide to establish a connection with the peripheral to offload the backlogged data. This connection-based approach allows for bidirectional communication, enabling the central to request and receive the logged data from the peripheral. The central may then log this data and transmit it to the backend for further processing and analysis.

The ability to offload backlogged data that is temporarily stored in a peripheral memory through this on-demand connection approach may provide one or more advantages including:

1. High-Resolution Data: The peripheral can log sensor data at a high resolution (e.g., every few seconds) and offload this data when necessary, providing a detailed historical record of sensor readings.
2. Efficient Data Transmission: By using broadcasts for real-time data transmission and a connection-based approach for offloading backlogged data, the system optimizes the use of available bandwidth and power resources.
3. Flexibility: The system can adapt to various application requirements, such as monitoring fuel levels, tire pressure, or other sensor data, by adjusting the logging frequency and offloading thresholds.
4. Data Integrity: The connection-based approach ensures that all logged data is transmitted to the central, reducing the risk of data loss and ensuring data integrity.

By providing a mechanism for high-resolution data logging and efficient data transmission, the low power communication architecture addresses limitations of real-time BLE broadcasts.

In some implementations, a field of a broadcast (e.g., a version or flag filed) may be used to specify the format or schema of the data being transmitted, allowing the system to recognize and interpret different versions of payload (e.g., sensor) data. This functionality allows implementation of changes or updates without disrupting existing functionalities or necessitating extensive modifications. For example, when new types of sensor data or communication protocols are introduced, the version field can indicate these changes, enabling the system to process the updated data correctly.

Use of a version filed may also provide backward compatibility, allowing the system to continue supporting older configurations of payload data, thereby maintaining the functionality of legacy devices or applications even as new updates are implemented. Additionally, use of a version field may reduce maintenance efforts, as updates can be implemented more efficiently, minimizing the need for extensive testing or debugging when new data structures are introduced.

Satellite Centrals

The reach and reliability of the low power communication network may be expanded by leveraging satellite technology. For example, a backend may receive observation stats directly from a satellite central that observes broadcast from peripherals, even when in remote or hard-to-reach areas where terrestrial centrals may not be available. This hybrid approach of combining terrestrial and satellite centrals enhances the overall coverage and accuracy of the geolocation data, providing a more comprehensive solution for tracking and monitoring sensor data across diverse environments.

In some implementations, a satellite may be configured with BLE central functionality so that this "satellite central" may observe BLE broadcasts and extract information from the broadcasts in the same manner as a terrestrial central. For example, a peripheral may be configured to transmit two different broadcasts, a low power broadcast intended for observation by terrestrial centrals (as discussed elsewhere herein) and a higher power broadcast intended for observation by satellite centrals. Upgrading an existing peripheral to be configured to transmit these higher power broadcasts may be accomplished via a firmware update (that may be received via connection to a central). The peripheral may be configured to alternate transmission of high and low power broadcasts or may be configured to transmit high power broadcasts less frequently that low power broadcasts (e.g., 1 high power broadcast for each 20 low power broadcasts) or when observation of low power broadcasts by a terrestrial central is not possible, such as in remote areas.

Figure 4:
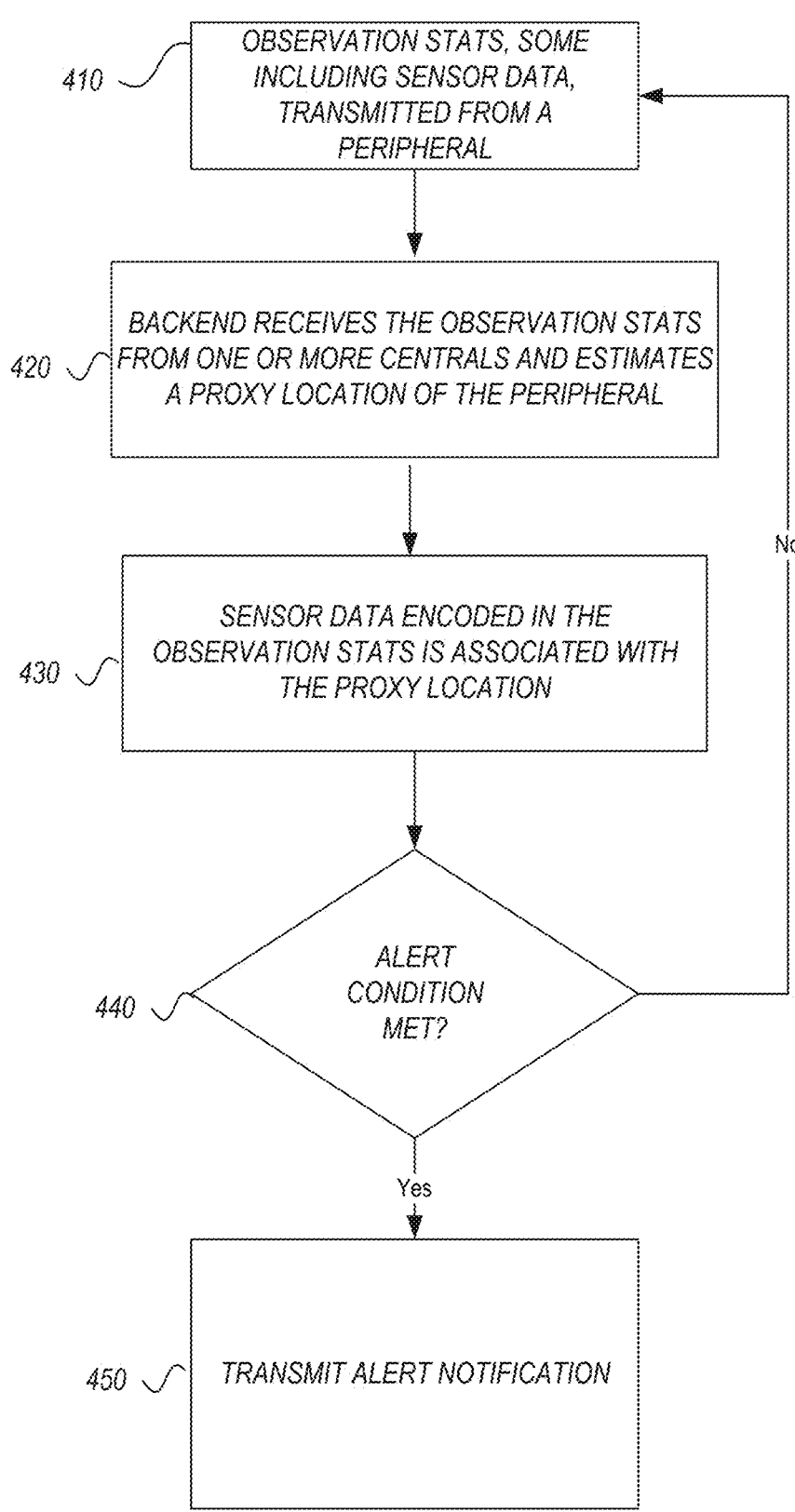
FIG. 4 is a flowchart illustrating one embodiment of a method for communicating sensor data in a low power communication network.

FIG. 4 is a flowchart illustrating one embodiment of a method of communicating sensor data in a low power communication network. The method may be performed by one or more devices within the network, such as a peripheral, central, and/or backend. Depending on the embodiment, the method may include fewer or additional blocks, and the blocks may be performed in an order different than illustrated.

Beginning at block 410, a plurality of observation stats are received at a backend, each associated with a peripheral, from one or more centrals. These observation stats include the geographic location of the central at the time a broadcast from the peripheral was received, with at least one of the observation stats embedding sensor data within the broadcast. In a first example, a sensor attached to a storage tank broadcasts the current liquid level, and this data is captured by nearby centrals, which then relay the information to the backend along with their location data. In a second example, a tire pressure sensor on a vehicle broadcasts the current tire pressure, which is picked up by centrals in the vicinity and sent to the backend with location information.

Next, at block 420, the backend estimates a proxy location of the peripheral based on one or more of the locations provided by the centrals. Continuing the storage tank example, the backend uses the location data from multiple centrals to triangulate and estimate the precise location of the tank, ensuring that the sensor data is accurately linked to the correct geographic position. Continuing the vehicle tire example, the backend calculates the approximate location of the tire by analyzing the location data from the centrals that received the tire pressure broadcast, allowing for accurate tracking of the vehicle's position.

At block 430, the sensor data received in the broadcast is associated with the determined proxy location, linking the sensor data to a specific geographic location. In the storage tank example, the liquid level data is tied to the exact location of the tank, allowing for precise monitoring and analysis. In the vehicle tire example, the tire pressure data is linked to the vehicle's current location, facilitating real-time monitoring of tire conditions, even as the vehicle moves.

At block 440, the backend monitors the sensor data to ascertain whether an alert condition is met, evaluating the sensor data against predefined thresholds or criteria. In the storage tank example, the backend may continuously or periodically check the liquid level data to determine if it falls below a critical threshold, indicating a potential issue such as a leak or depletion. In the vehicle tire example, the backend may monitor the tire pressure data to detect if it drops below a safe level, which could indicate a puncture or slow leak.

Finally, at block 450, upon detecting an alert condition, the backend triggers an alert that identifies both the alert condition and the proxy location of the peripheral at the time the condition was met. In the storage tank example, this could involve sending an alert to maintenance personnel, indicating that the tank at the specified location requires immediate attention due to low liquid levels. In the vehicle tire example, an alert could be sent to the driver or fleet manager, notifying them of the low tire pressure and the vehicle's location, prompting timely maintenance to prevent further issues.

Other

In some implementations, security mechanisms may be implemented to protect the integrity and confidentiality of the transmitted sensor data. For example, encryption and encoding techniques may be implemented to prevent unauthorized access and replay attacks. Thus, sensor data within the TLV structure can be encrypted, such as by using existing encryption algorithms, to ensure that only authorized devices (e.g., authorized centrals or backends) can decode and interpret the sensor data.

While certain types of sensors and sensor data are discussed herein, the systems and methods discussed herein can be used with any type of sensors and applications of the sensor data beyond those explicitly mentioned. For example, sensors monitoring humidity, pressure, cargo levels, door status, and the like may communicate with peripherals configured to transmit sensor data embedded in broadcasts, as discussed herein. The flexible nature of the TLV structure allows for the encoding of diverse types of sensor data, making the system adaptable to a wide range of use cases and industries.

Figure 5:
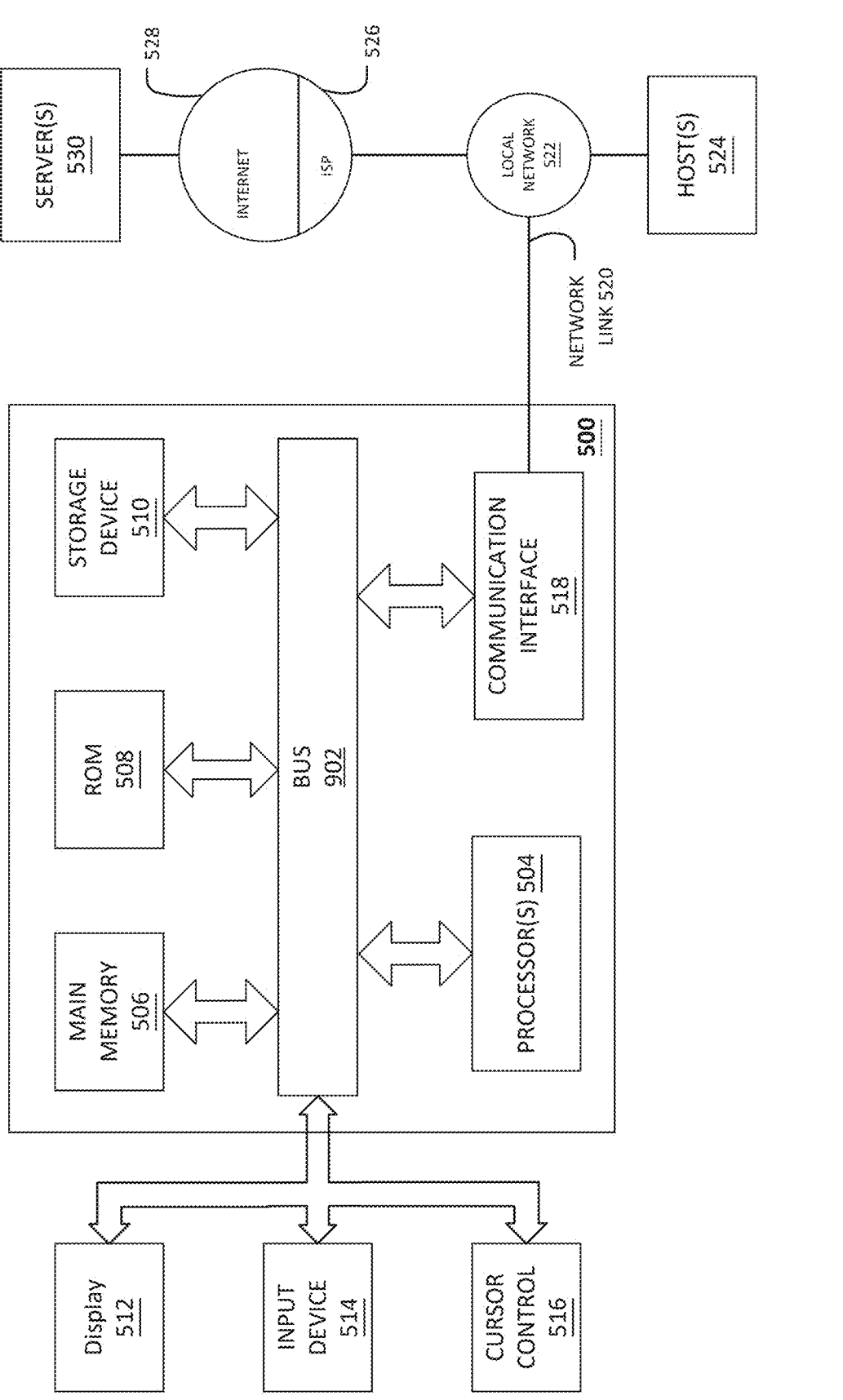
FIG. 5 is a block diagram that illustrates a computer system upon which various embodiments of the systems and/or processes illustrated in the figures and/or discussed herein may be implemented.

FIG. 5 is a block diagram that illustrates a computer system 500 upon which various embodiments of the systems and/or processes illustrated in the figures and/or discussed herein may be implemented. For example, in various examples, the computer components of a computing device, such as a central or peripheral, may be implemented with some or all of the components of the example computer system 500.

Example computer system 500 includes a bus 502 or other communication mechanism for communicating information, and a hardware processor, or multiple processors, 504 coupled with bus 502 for processing information. The hardware processor(s) 504 may be, for example, multi-core processors, specialized processors such as graphic processing units (GPUs), and/or general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 509 or other static storage device coupled to bus 502 for storing static information and instructions for processor 504. A storage device 510, such as a solid-state drive (SSD), magnetic disk, optical disk, or USB thumb drive (Flash drive), etc., is provided and coupled to bus 502 for storing information and instructions.

Computer system 500 may be coupled via bus 502 to a display 512, such as a high-definition display or touchscreen, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine.

In some implementations, the techniques herein are performed by computer system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

Various forms of computer readable storage media may be involved in carrying one or more sequences of one or more computer readable program instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504. Instructions may initially be stored on a remote cloud server (e.g., a Backend) and transmitted over the Internet to computer system 500.

Computer system 500 also includes a communication interface 519 coupled to bus 502. Communication interface 519 provides a two-way data communication coupling to a network link 520 that is connected to a local network 522. For example, communication interface 519 may be an integrated services digital network (ISDN) card, cable modem, satellite modem, or a modem to provide a data communication connection to a corresponding type of telephone line. As another example, communication interface 519 may be a local area network (LAN) card to provide a data communication connection to a compatible LAN (or WAN component to communicate with a WAN). Wireless links may also be implemented. In any such implementation, communication interface 519 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 529. Local network 522 and Internet 529 both use electrical, electromagnetic or optical signals that carry digital data streams. The signals through the various networks and the signals on network link 520 and through communication interface 519, which carry the digital data to and from computer system 500, are example forms of transmission media.

Computer system 500 can send messages and receive data, including program code, through the network(s), network link 520 and communication interface 519. In the Internet example, a cloud server 530 might transmit a requested code for an application program through Internet 529, ISP 526, local network 522 and communication interface 519. The received code may be executed by processor 504 as it is received, and/or stored in storage device 510, or other non-volatile storage for later execution.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

Example Clauses

Examples of the implementations of the present disclosure can be described in view of the following example clauses (and the example clauses provided above). The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computerized method, performed by a computing system having one or more hardware computer processors and one or more non-transitory computer readable storage device storing software instructions executable by the computing system to perform the computerized method comprising: receiving a plurality of observation stats each associated with a peripheral from a plurality of centrals, each of the observation stats including a geographic location of the central when a broadcast from the peripheral was received and at least one of the observation stats including sensor data embedded in the broadcast; estimating a proxy location of the peripheral based on one or more of the locations of the centrals; associating the sensor data with the proxy location; monitoring the sensor data to determine if an alert condition is met; and in response to detecting the alert condition, triggering an alert identifying the alert condition and the proxy location of the peripheral when the alert condition was met.

Clause 2. The computerized method of clause 1, wherein the sensor data is embedded in a Tag-Length-Value (TLV) structure of the broadcast.

Clause 3. The computerized method of clause 2, wherein the at least one observation stat including sensor data includes a coded value in a Service UUID field indicating a type of data included in the TLV structure that follows the Service UUID field.

Clause 4. The computerized method of clause 1, wherein the alert condition is based on a threshold value of the sensor data.

Clause 5. The computerized method of clause 4, wherein the threshold value is dynamically adjustable based on historical data trends.

Clause 6. The computerized method of clause 1, further comprising: transmitting the alert to a user device or monitoring system for further action.

Clause 7. The computerized method of clause 1, wherein the sensor data includes sensor data associated with a physical asset and indicating one or more of: tire pressure; tank level; accelerometer data; door monitor status; GPS position recorded by the peripheral, voltage level; current level; or panic button status.

Clause 8. The computerized method of clause 1, further comprising: using machine learning algorithms to analyze one or more of the sensor data or the geolocation data for anomaly detection.

Clause 9. The computerized method of clause 1, wherein the proxy location is determined using a triangulation algorithm based on geographic locations from multiple centrals.

Clause 10. The computerized method of clause 1, further comprising: encrypting the sensor data and geolocation data before transmission.

Clause 11. The computerized method of clause 2, wherein the TLV structure includes a unique signature or timestamp to facilitate deduplication of data on a backend.

Clause 12. The computerized method of clause 1, further comprising: generating a visual representation of the proxy location and associated sensor data on a map interface for user monitoring and analysis.

Clause 13. The computerized method of clause 1, wherein at least one of the centrals is a satellite central.

Clause 14. The computerized method of clause 2, wherein a first tag indicates that the following TLV includes a quantity of sensor data values available for upload to the backend, wherein if the quantity of sensor data values exceeds a threshold the receiving central is configured to establish a connection with the peripheral to offload the sensor data values.

Clause 15. The computerized method of clause 14, wherein the first tag is included in one or more broadcasts from the peripheral when an internal memory of the peripheral reaches a threshold.

Clause 16. A method for enhancing the reach and reliability of an asset tracking network using satellite centrals, comprising: receiving observation stats directly from a satellite central that observes broadcasts from peripherals, even in remote or hard-to-reach areas where terrestrial centrals may not be available; combining observation stats from both terrestrial and satellite centrals to enhance the overall coverage and accuracy of geolocation data; and processing the combined observation stats to provide a comprehensive solution for tracking and monitoring sensor data across diverse environments.

Clause 17. The method of clause 16, wherein the peripherals are configured to transmit low power broadcasts intended for observation by terrestrial centrals and higher power broadcasts intended for observation by satellite centrals.

Clause 18. The method of clause 17, wherein the peripherals are configured to alternate transmission of high and low power broadcasts.

Clause 19. The method of clause 17, wherein the peripherals are configured to transmit high power broadcasts less frequently than low power broadcasts.

Clause 20. The method of clause 17, wherein the peripherals transmit high power broadcasts when observation of low power broadcasts by a terrestrial central is not possible.

Clause 21. A system for transmitting sensor data via Bluetooth Low Energy (BLE) broadcasts, comprising: a BLE peripheral configured to encode sensor data into a BLE peripheral broadcast using a Service UUID and a Tag-Length-Value (TLV) structure, and to transmit the BLE peripheral broadcast in a connectionless manner; one or more centrals configured to receive the BLE peripheral broadcast, log the received sensor data along with geolocation data, and transmit the logged sensor data and geolocation data to a backend; and a backend configured to aggregate the sensor data and geolocation data from the one or more centrals.

Clause 22. The system of clause 21, wherein the BLE peripheral is further configured to include a unique signature or timestamp within the TLV structure to facilitate deduplication of data on the backend.

Clause 23. The system of clause 21, wherein the BLE peripheral is further configured to offload backlogged data through a connection-based approach when its internal memory reaches a certain threshold, and to include an indicator in its BLE broadcasts to signal a need for a connection to offload the backlogged data.

Clause 24. The system of clause 21, wherein the backend is further configured to integrate geolocation data from multiple centrals to determine a proxy location of the BLE peripheral by triangulating the position of the BLE peripheral with higher accuracy.

Clause 25. The system of clause 21, wherein the BLE peripheral and the one or more centrals are further configured to use security mechanisms to protect confidentiality of the transmitted data, including encryption and encoding techniques to prevent unauthorized access and replay attacks.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like, with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like, may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

The invention claimed is:

1. A computerized method, performed by a computing system having one or more hardware computer processors and one or more non-transitory computer readable storage device storing software instructions executable by the computing system to perform the computerized method comprising:

receiving a plurality of observation stats each associated with a peripheral from a plurality of centrals, each of the observation stats including a geographic location of the central when a broadcast from the peripheral was received and at least one of the observation stats including sensor data embedded in the broadcast;

for ones of the observation stats:

estimating a proxy location of the peripheral based on a corresponding geographic location of the central from which the observation stat was received; and associating the sensor data with the proxy location;

monitoring the sensor data to determine if an alert condition is met; and in response to detecting the alert condition, triggering an alert identifying the alert condition and the proxy location of the peripheral when the alert condition was met.

2. The computerized method of claim 1, wherein the sensor data is embedded in a Tag-Length-Value (TLV) structure of the broadcast.

3. The computerized method of claim 2, wherein at least one of the observation stats includes a coded value in a Service UUID field indicating a type of data included in the TLV structure that follows the Service UUID field.

4. The computerized method of claim 1, wherein the alert condition is based on a threshold value of the sensor data.

5. The computerized method of claim 4, wherein the threshold value is dynamically adjustable based on historical data trends.

6. The computerized method of claim 1, further comprising:

transmitting the alert to a user device or monitoring system for further action.

7. The computerized method of claim 1, wherein the sensor data includes sensor data associated with a physical asset and indicating one or more of:

tire pressure;

tank level;

accelerometer data;

door monitor status;

GPS position recorded by the peripheral, voltage level;

current level; or panic button status.

8. The computerized method of claim 1, further comprising:

using machine learning algorithms to analyze one or more of the sensor data or the geographic location for anomaly detection.

9. The computerized method of claim 1, wherein the proxy location is determined using a triangulation algorithm based on geographic locations from multiple centrals.

10. The computerized method of claim 1, further comprising:

encrypting the sensor data and geolocation data before transmission.

11. The computerized method of claim 2, wherein the TLV structure includes a unique signature or timestamp to facilitate deduplication of data on a backend.

12. The computerized method of claim 1, further comprising:

generating a visual representation of the proxy location and associated sensor data on a map interface for user monitoring and analysis.

13. The computerized method of claim 1, wherein at least one of the centrals is a satellite central.

14. The computerized method of claim 2, wherein a first tag indicates that the following TLV includes a quantity of sensor data values available for upload to the backend, wherein if the quantity of sensor data values exceeds a threshold the receiving central is configured to establish a connection with the peripheral to offload the sensor data values.

15. The computerized method of claim 14, wherein the first tag is included in one or more broadcasts from the peripheral when an internal memory of the peripheral reaches a threshold.

16. A method for enhancing the reach and reliability of an asset tracking network using satellite centrals, comprising:

receiving observation stats directly from a satellite central that observes broadcasts from terrestrial peripherals, even in remote or hard-to-reach areas where terrestrial centrals may not be available;

combining observation stats from both terrestrial and satellite centrals to enhance the overall coverage and accuracy of geolocation data; and processing the combined observation stats to provide a comprehensive solution for tracking and monitoring sensor data across diverse environments.

17. The method of claim 16, wherein the peripherals are configured to transmit low power broadcasts intended for observation by terrestrial centrals and higher power broadcasts intended for observation by satellite centrals.

18. The method of claim 17, wherein the peripherals are configured to alternate transmission of high and low power broadcasts.

19. The method of claim 17, wherein the peripherals are configured to transmit high power broadcasts less frequently than low power broadcasts.

20. A computing system comprising:

a hardware computer processor; and a non-transitory computer readable medium having software instructions stored thereon, the software instructions executable by the hardware computer processor to cause the computing system to perform operations comprising:

receiving a plurality of observation stats each associated with a peripheral from a plurality of centrals, each of the observation stats including a geographic location of the central when a broadcast from the peripheral was received and at least one of the observation stats including sensor data embedded in the broadcast;

for ones of the observation stats:

estimating a proxy location of the peripheral based on a corresponding geographic location of the central from which the observation stat was received; and associating the sensor data with the proxy location;

monitoring the sensor data to determine if an alert condition is met; and in response to detecting the alert condition, triggering an alert identifying the alert condition and the proxy location of the peripheral when the alert condition was met.

* * * * *